US010362542B2

(12) United States Patent
Fu et al.

(10) Patent No.: US 10,362,542 B2
(45) Date of Patent: Jul. 23, 2019

(54) METHOD AND APPARATUS FOR TRANSMITTING UPLINK DEMODULATION REFERENCE SIGNALS

(71) Applicant: Samsung Electronics Co., Ltd., Suwon-si, Gyeonggi-do (KR)

(72) Inventors: Jingxing Fu, Beijing (CN); Bin Yu, Beijing (CN); Chen Qian, Beijing (CN); Qi Xiong, Beijing (CN)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 15/474,604

(22) Filed: Mar. 30, 2017

(65) Prior Publication Data

US 2017/0289924 A1 Oct. 5, 2017

(30) Foreign Application Priority Data

Mar. 31, 2016 (CN) .......................... 2016 1 0200510
May 13, 2016 (CN) .......................... 2016 1 0320080
(Continued)

(51) Int. Cl.
H04L 5/00 (2006.01)
H04W 52/24 (2009.01)
(Continued)

(52) U.S. Cl.
CPC ......... H04W 52/246 (2013.01); H04L 5/0016 (2013.01); H04L 5/0048 (2013.01);
(Continued)

(58) Field of Classification Search
CPC ............ H04W 52/246; H04W 72/0413; H04L 5/0048
See application file for complete search history.

(56) References Cited

U.S. PATENT DOCUMENTS

2013/0039332 A1* 2/2013 Nazar ................... H04W 72/04
370/330
2014/0036850 A1 2/2014 Akimoto et al.
(Continued)

FOREIGN PATENT DOCUMENTS

EP 2 731 395 A1 5/2014
WO 2013/067345 A1 5/2013
(Continued)

OTHER PUBLICATIONS

ZTE, Link level performance of DMRS for V2V, R1-160692, 3GPP TSG-RAN WG1 Meeting #84, Feb. 15-19, 2016, St Julian's, Malta.
Extended European Search Report dated Feb. 1, 2019, issued in the European application No. 17775876.0.

Primary Examiner — Dong-Chang Shiue
(74) Attorney, Agent, or Firm — Jefferson IP Law, LLP

(57) ABSTRACT

A method and an apparatus for transmitting uplink demodulation reference signals (DMRSs) is provided. The method includes a user equipment (UE) determines an uplink DMRS format for demodulating a physical uplink shared channel (PUSCH) according to frequency-domain resources occupied by the PUSCH, in which the uplink DMRS format includes a comb occupied by a PUSCH DMRS sequence. The comb is subcarriers having specified intervals occupied by demodulation reference signals, and the specified intervals between the occupied subcarriers are same. For the DMRSs using the comb format, subcarriers with specific intervals are used for channel estimation, and values of the channel estimation are used for data demodulation. The UE transmits uplink information and the demodulation reference signals on physical resources using the uplink DMRS format. The present disclosure can improve the multiplexing ratio of uplink physical resources in a multi-UE scenario.

16 Claims, 10 Drawing Sheets

(30) Foreign Application Priority Data

Aug. 19, 2016 (CN) .......................... 2016 1 0694476
Sep. 20, 2016 (CN) .......................... 2016 1 0834849

(51) Int. Cl.
*H04W 72/04* (2009.01)
*H04W 52/14* (2009.01)
*H04W 52/32* (2009.01)
*H04L 5/14* (2006.01)

(52) U.S. Cl.
CPC ......... *H04L 5/0094* (2013.01); *H04W 52/146* (2013.01); *H04W 52/325* (2013.01); *H04W 72/0413* (2013.01); *H04L 5/1469* (2013.01)

(56) References Cited

U.S. PATENT DOCUMENTS

| | | | |
|---|---|---|---|
| 2014/0198747 A1* | 7/2014 | Ouchi | H04L 5/0053 370/329 |
| 2014/0286255 A1 | 9/2014 | Nam et al. | |
| 2016/0006548 A1* | 1/2016 | Yang | H04L 5/0094 370/329 |
| 2016/0020878 A1* | 1/2016 | Yokomakura | H04L 5/0023 370/329 |
| 2017/0264408 A1* | 9/2017 | Patel | H04L 5/0048 |

FOREIGN PATENT DOCUMENTS

| | | | | |
|---|---|---|---|---|
| WO | 2015-115819 A1 | 8/2015 | | |
| WO | WO 2015115819 A1 * | 8/2015 | ........... | H04L 5/0051 |

* cited by examiner

FIG. 4
(RELATED ART)
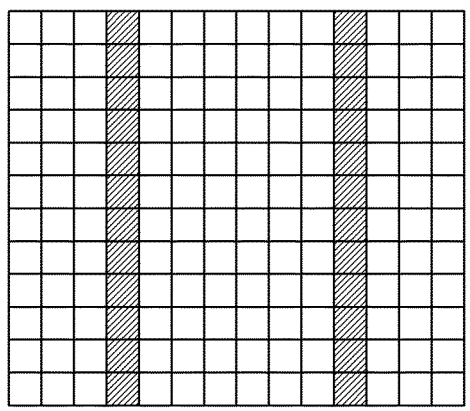
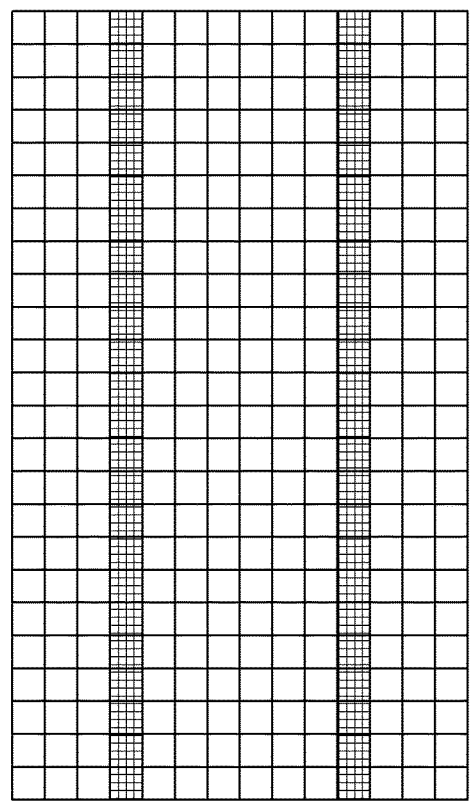

FIG. 6
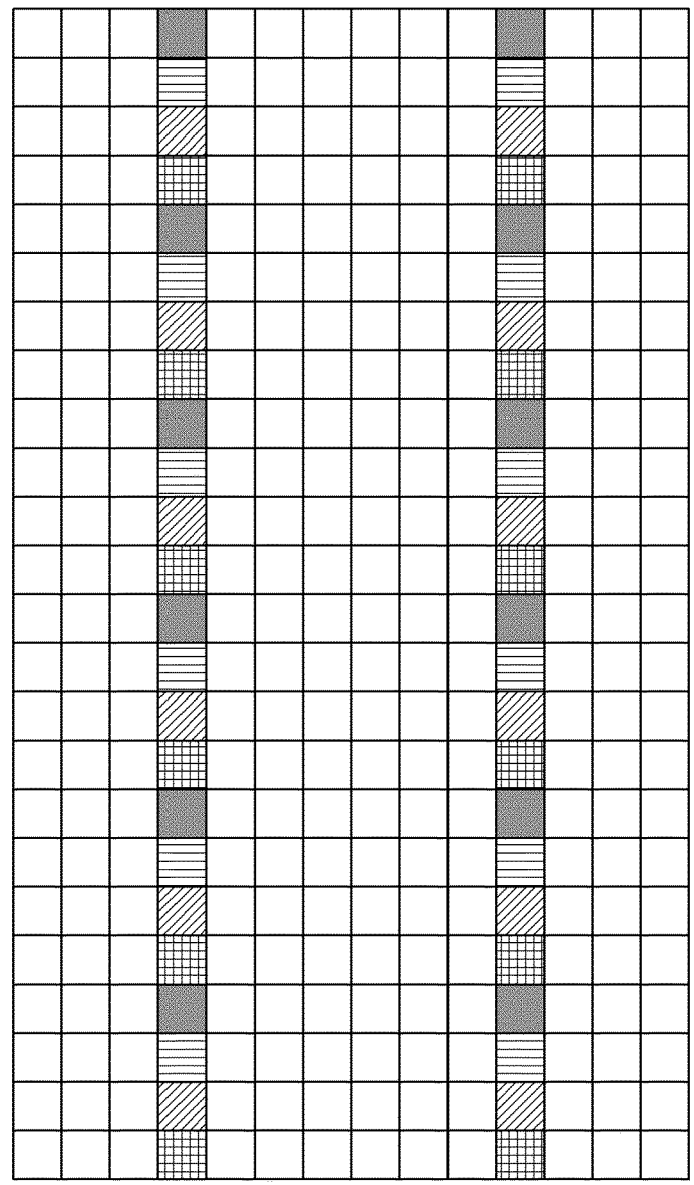
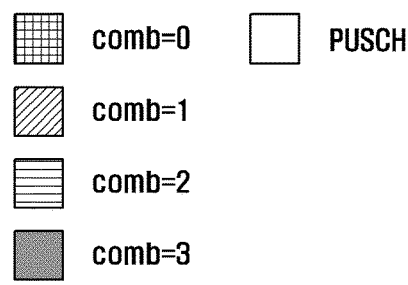

FIG. 7
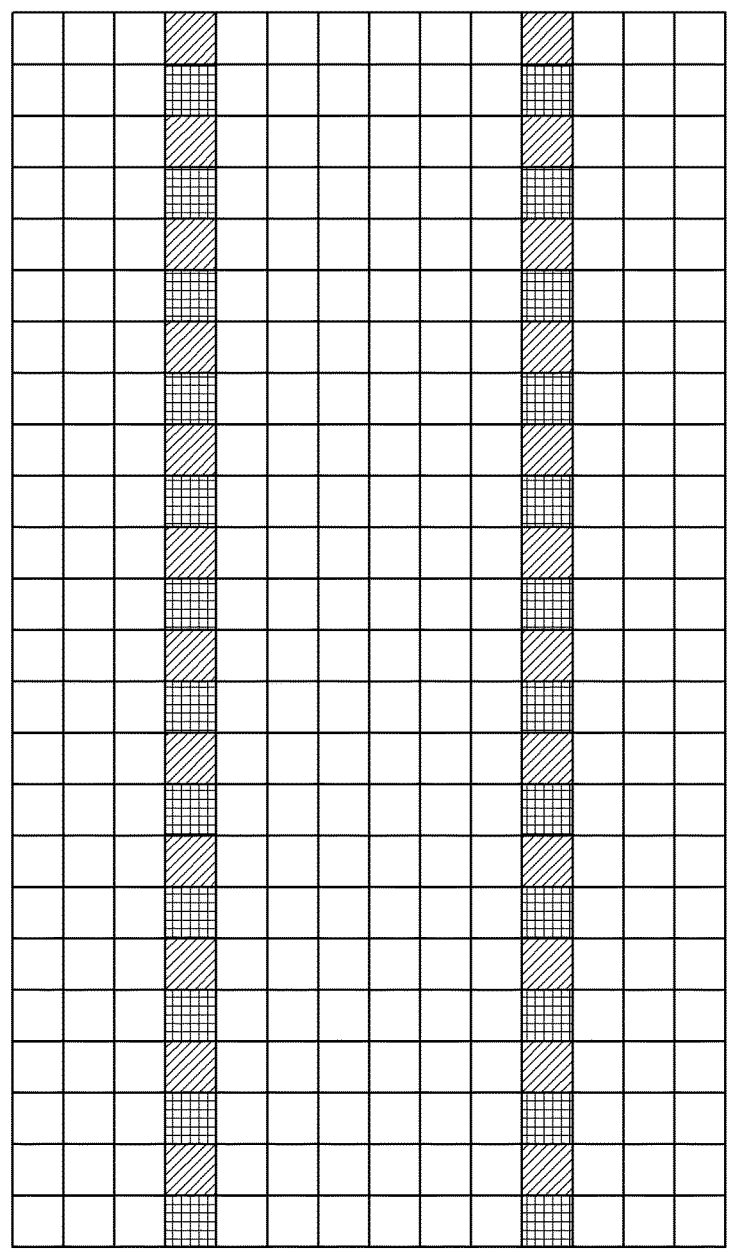
 DMRS resources not used by UE1
 DMRS resources used by UE1
 Resources used by UE1 for PUSCH transmission FIG. 9
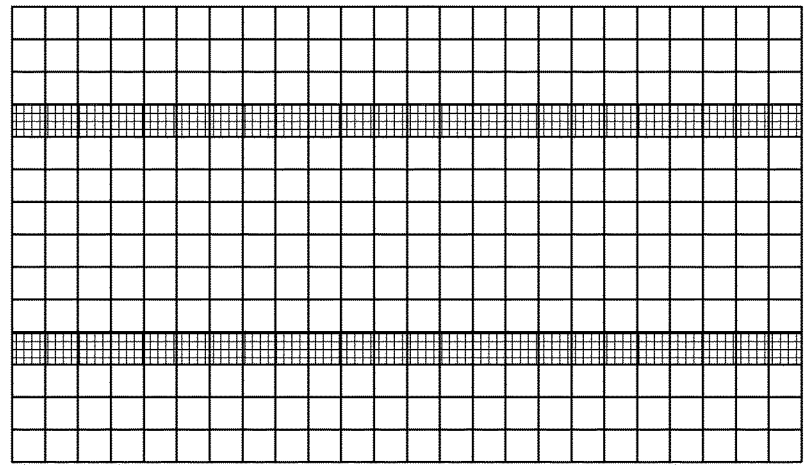
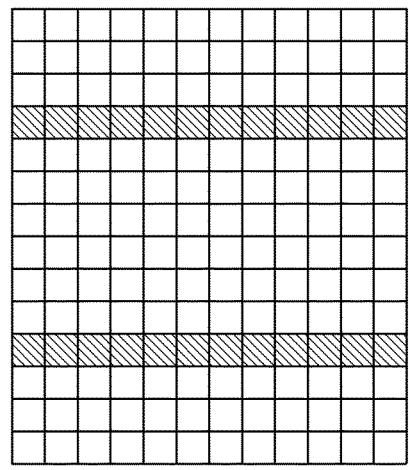

METHOD AND APPARATUS FOR TRANSMITTING UPLINK DEMODULATION REFERENCE SIGNALS

CROSS-REFERENCE TO RELATED APPLICATION(S)

This application claims the benefit under 35 U.S.C. § 119(a) of a Chinese patent application filed on Mar. 31, 2016 in the State Intellectual Property Office and assigned Serial number 201610200510.2, and of a Chinese patent application filed on May 13, 2016 in the State Intellectual Property Office and assigned Serial number 201610320080.8, and of a Chinese patent application filed on Aug. 19, 2016 in the State Intellectual Property Office and assigned Serial number 201610694476.9, and of a Chinese patent application filed on Sep. 20, 2016 in the State Intellectual Property Office and assigned Serial number 201610834849.8, the entire disclosure of each of which is hereby incorporated by reference.

TECHNICAL FIELD

The present disclosure relates to radio communication systems. More particularly, the present disclosure relates to a method and an apparatus for transmitting uplink demodulation reference signals.

BACKGROUND

At present, a long term evolution (LTE) system supports two types of duplex frequency division duplex (FDD) and time division duplex (TDD). LTE transmission includes transmission from a base station (an evolved nodeB (eNB)) to a user equipment (UE) (downlink (DL)), and transmission from the UE to the base station (uplink (UL)). In a TDD system, downlink and uplink are transmitted in a same carrier at different times, and in a FDD system, downlink and uplink are transmitted in different carriers.

FIG. 1 is a schematic diagram of an LTE TDD frame structure according to the related art.

Referring to FIG. 1, each radio frame is 10 ms long, and is equally divided into two half frames having a length of 5 ms each. Each half frame includes 8 timeslots having a length of 0.5 ms each and 3 special fields, i.e., a downlink pilot timeslot (DwPTS), a guard period (GP), and an uplink pilot timeslot (UpPTS). An overall length of the 3 special fields is 1 ms. Each subframe consists of two consecutive timeslots.

In an LTE system, when uplink data are transmitted on a physical uplink shared channel (PUSCH), a demodulation reference signal (DMRS) is required to estimate channels.

FIG. 2 is a schematic diagram of a PUSCH and DMRS configuration according to the related art.

Referring to FIG. 2, for a normal cyclic prefix (CP) configuration, 12 single carrier-frequency division multiple access (SC-FDMA) symbols are used as PUSCHs and 2 SC-FDMA symbols are used as DMRSs. For an extended cyclic prefix (CP) configuration, 10 SC-FDMA symbols are used for PUSCHs, and 2 SC-FDMA symbols are used for DMRSs. A DMRS sequence is generated from the following formula: $r_{PUSCH}(m \cdot M_{sc}^{RS}+n)=w(m)r_{u,v}^{(\alpha)}(n)$, where m=0, 1, representing different SC-FDMA symbols at timeslot 0 and timeslot 1, and n=0, 1, ..., $M_{sc}^{RS}-1$, representing subcarriers for PUSCHs and DMRSs. $r_{u,v}^{(\alpha)}(n)$ represents the DMRS sequence, and a specific method of generating it may be seen in the version V8.9.0 (2009-12) of 3GPP TS 36.211. $M_{sc}^{RS}$ represents the number of subcarriers allocated to the UE for the PUSCHs, and α represents a cyclic shift (CS). Orthogonal cover code (OCC) w(m)(m=0,1) includes [w(0) w(1)]=[1 1] and [w(0)w(1)]=[1 −1].

FIG. 3 is a schematic diagram of a DMRS configuration of different UEs according to the related art.

Referring to FIG. 3, when PUSCH frequency-domain resources allocated to different UEs overlap completely, DMRSs adopting different cyclic shifts of a same Zadoff-Chu sequence are orthogonal, and DMRSs adopting different OCCs of a same Zadoff-Chu sequence are orthogonal too. When the PUSCH frequency-domain resources allocated to the different UEs overlap incompletely, DMRSs using different cyclic shifts of a Zadoff-Chu sequence are not orthogonal.

FIG. 4 is a schematic diagram of a DMRS configuration of different UEs according to the related art.

Referring to FIG. 4, DMRSs using different OCCs of a Zadoff-Chu sequence are orthogonal. However, if there are two SC-FDMA symbols in the time domain used as DMRSs, there will be only two orthogonal OCCs, and, when there are more than two UEs of uplink PUSCH shared resources, and PUSCH frequency-domain resources allocated for PUSCH of the UEs overlap incompletely, there will not be enough orthogonal DMRSs in the traditional art to make more UEs multiplex uplink physical resources. For example, in this case, when there are multiple UEs, the multiplexing ratio of the uplink physical resources will be relatively low.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for transmitting uplink demodulation reference signals to increase the multiplexing ratio of uplink physical resources in a multi-UE scenario.

Another aspect of the present disclosure is to provide a method for transmitting uplink demodulation reference signals (DMRSs), including determining, by a user equipment (UE), an uplink DMRS format for demodulating a physical uplink shared channel (PUSCH) according to frequency-domain resources occupied by the PUSCH, transmitting, by the UE, uplink information and the demodulation reference signals on physical resources using the uplink DMRS format, wherein the uplink DMRS format comprises a comb occupied by a PUSCH DMRS sequence, and the comb including subcarriers having specified intervals occupied by demodulation reference signals, and the specified intervals between the occupied subcarriers are same, transmitting, by the UE, uplink information and the demodulation reference signals on physical resources using the uplink DMRS format.

In an embodiment of the present disclosure, the uplink DMRS format further includes at least one of the following formats a cyclic shift (CS) of the PUSCH DMRS sequence, and an orthogonal cover code (OCC) of the PUSCH DMRS sequence.

In an embodiment of the present disclosure, when the PUSCH is scheduled by control signaling, and determining the uplink DMRS format for demodulating the PUSCH includes determining, by the UE, a candidate set from a set of OCCs, a set of CSs, and a set of combs to be used by the UE by receiving higher layer signaling or by being preset, and determining an OCC to be used from the set of OCCs, and/or determining a CS to be used from the set of CSs, and/or determining a comb to be used from the set of combs by receiving physical layer signaling, or, determining, first by the UE, the candidate set from the set of OCCs, the set of CSs, and the set of combs to be used by the UE by being preset, and determining the OCC to be used from the set of OCCs, and/or determining the CS to be used from the set of CSs, and/or determining the comb to be used from the set of combs by receiving higher layer signaling, or, determining, by the UE, the OCC, and/or the CS, and/or the comb to be used by receiving higher layer signaling directly. In an embodiment of the present disclosure, determining the OCC to be used from the set of OCCs, and/or determining the CS to be used from the set of CSs, and/or determining the comb to be used from the set of combs by receiving physical layer signaling, includes determining, by the UE, the OCC to be used from the set of OCCs, and/or determining the CS to be used from the set of CSs, and/or determining the comb to be used from the set of combs, according to a corresponding number of bits of signaling in downlink control information (DCI) received, in which the OCC, the CS or the comb are instructed by the corresponding numbers of bits of signaling in DCI.

In an embodiment of the present disclosure, determining, by the UE, the OCC, and/or the CS, and/or the comb to be used by receiving higher layer signaling directly includes determining, according to higher layer signaling, a set of PRB numbers possibly allocated to the PUSCH of the UE, and determining an OCC, a CS, and/or a comb for a PUSCH demodulation reference signal of each PRB number in the set of PRB numbers.

In an embodiment of the present disclosure, the PUSCH has control signaling scheduling, and determining the uplink demodulation reference signal format for demodulating the PUSCH includes determining a set of combinations of OCC and comb according to being configured by higher layer signaling or according to being preset, determining a combination of OCC and comb to be used by the DMRSs of the UE from the set of combinations of OCC and comb according to being configured by higher layer signaling or according to being instructed by physical layer signaling, in which a CS to be used by the DMRSs of the UE is configured separately by higher layer signaling, or instructed by physical layer signaling separately, or determined by being preset separately, or, determining a set of combinations of OCC, comb, and CS according to being configured by higher layer signaling or according to being preset, and determining a combination of OCC, comb, and CS to be used by the DMRSs of the UE from the set of combinations of OCC, comb, and CS according to being configured by higher layer signaling or according to being instructed by physical layer signaling.

In an embodiment of the present disclosure, when the combination of OCC and comb to be used is instructed by physical layer signaling, the method includes instructing the combination of OCC and comb to be used using instruction signaling of the combination of OCC and comb in DCI, and determining, by the UE, the combination of OCC and comb to be used by the DMRSs of the UE from the set of combinations of OCC and comb, according to instruction signaling of the combination of OCC and comb in DCI received by the UE, or when the combination of OCC, comb, and CS to be used is instructed by physical layer signaling, the method includes instructing the combination of OCC, comb, and CS to be used using instruction signaling of the combination of OCC, comb, and CS in DCI, and determining, by the UE, the combination of OCC, comb, and CS to be used by the DMRSs of the UE from the set of combinations of OCC, comb, and CS, according to instruction signaling of the combination of OCC, comb, and CS in DCI received by the UE.

In an embodiment of the present disclosure, determining the set of combinations of OCC, comb, and CS according to being configured by higher layer signaling or according to being preset by the protocol includes determining the number L of DMRSs currently required, and if L is smaller than a maximum of the number of the combinations of OCC, comb, and CS, determining a subset of the set of combinations of OCC, comb, and CS according to being configured by higher layer signaling or according to being preset, in which the number of combinations of OCC, comb, and CS in the subset is L, determining a combination of OCC, comb, and CS to be used by the DMRSs of the UE from the subset.

In an embodiment of the present disclosure, when the combination of OCC, comb, and CS to be used is instructed by physical layer signaling, the number of bits required for instruction signaling of the combination of OCC, comb, and CS in DCI is a ceiling value of log 2(L).

In an embodiment of the present disclosure, in case of a PUSCH without control signaling, determining the uplink demodulation reference signal format for demodulating the PUSCH includes determining, first by the UE, a set of OCCs, a set of CSs, and a set of combs to be used by the DMRS of the UE as a candidate set by receiving higher layer signaling or according to presetting, and determining an OCC to be used from the set of OCCs, and/or determining a CS to be used from the set of CSs, and/or determining a comb to be used from the set of combs by being configured by higher layer signaling or by initiative selection by the UE, or, determining directly, by the UE, the OCC, and/or the CS, and/or the comb to be used by the DMRSs of the UE by receiving higher layer signaling.

In an embodiment of the present disclosure, determining directly, by the UE, the OCC, and/or the CS, and/or the comb to be used by the DMRSs of the UE by receiving higher layer signaling includes determining a set of PRB numbers that are possibly allocated to the PUSCH of the UE according to higher layer signaling, and determining an OCC, a CS, and/or a comb for a PUSCH demodulation reference signal of each PRB number from the set of PRB numbers.

In an embodiment of the present disclosure, in case of the PUSCH without control signaling scheduling, determining the uplink demodulation reference signal format for demodulating the PUSCH includes determining a set of combinations of OCC and comb by being configured by higher layer signaling or according to being preset, determining a combination of OCC and comb to be used by the DMRSs of the UE from the set of combinations of OCC and comb by being configured by higher layer signaling or by being selected initiatively by the UE, and the CS to be used by the DMRSs of the UE is configured separately by the UE, or selected initiatively by the UE, or, determining a set of combinations of OCC, comb, and CS by being configured by higher layer signaling or by being preset, determining a combination of OCC, comb, and CS to be used by the DMRSs of the UE from the set of combinations of OCC, comb, and CS by being configured by higher layer signaling or by being selected initiatively by the UE.

In an embodiment of the present disclosure, determining the set of combinations of OCC, comb, and CS by being configured by higher layer signaling or by being preset includes determining the number L of DMRSs currently required, and if L is smaller than the maximum number of combinations of OCC, comb, and CS, determining a subset of the set of combinations of OCC, comb, and CS according to being configured by higher layer signaling or according to being preset, in which the number of combinations of OCC, comb, and CS in the subset is L, and determining a combination of OCC, comb, and CS to be used by the DMRSs of the UE from the subset.

In an embodiment of the present disclosure, the method further includes determining, by the UE, power of transmitting the DMRSs according to whether the DMRSs use a comb and according to a format of the comb used.

In an embodiment of the present disclosure, the method further includes if the UE uses a comb format to transmit the DMRSs, total power of all sub-carriers for transmitting DMRSs in each single carrier-frequency division multiplexing (SC-FDM) symbol is equal to total power of all sub-carriers for transmitting PUSCHs in each SC-FDM symbol.

In an embodiment of the present disclosure, the method further includes if the UE uses the comb format to transmit the DMRSs, transmission power of each DMRS subcarrier of the UE is equal to transmission power of each PUSCH subcarrier of the UE.

In an embodiment of the present disclosure, the method further includes if the UE uses the comb format to transmit the DMRSs, transmission power of a DMRS on each DMRS sub-carrier of the UE is not equal to transmission power of a PUSCH on each PUSCH sub-carrier of UE, and total transmission power of all sub-carriers of DMRSs in each SC-FDM symbol being equal to total transmission power of all sub-carriers of PUSCHs in each PUSCH SC-FDM symbol, or, transmission power of a DMRS in each subcarrier of each SC-FDM symbol of the UE being PDMRS=min{RPF*PPUSCH, P1}, where PDMRS is the transmission power in each subcarrier of each DMRS SC-FDM signal of the UE, PPUSCH is the transmission power in each subcarrier of each PUSCH SC-FDM signal of UE, P1 is the allowed maximum of transmission power in each subcarrier of each DMRS SC-FDM signal of the UE and transmission power in each subcarrier of each PUSCH SC-FDM signal of the UE.

In an embodiment of the present disclosure, the method further includes determining, by the UE, the DMRS sequence to be transmitted according to whether the DMRSs use the comb and according to the format of the comb.

In an embodiment of the present disclosure, if the number of PRBs of the PUSCH scheduled by the UE in the frequency-domain resources is an integral multiple M of a DMRS repetition factor (RPF), a length of the DMRS sequence is M times of the number of PRBs, or, the DMRS sequence transmitted by the UE satisfies the following conditions when frequency-domain resource of PUSCHs scheduled by UEs are same, and RPFs of DMRSs are same, if CSs of two DMRS sequences are different, the two DMRS sequences are orthogonal, or using the number of subcarriers of the PUSCH scheduled by the UE in the frequency-domain resources as a length of the DMRS sequence, and punching or truncating the DMRS sequence according to the length of the DMRS sequence, where a punching process is that within a range of scheduled PRBs, the DMRS sequence in positions of transmitting DMRSs is transmitted, and the DMRS sequence in other positions will not be transmitted, and a truncation process is that within the range of the scheduled PRBs, the UE transmits the DMRS sequence successively on DMRS positions according to an order and a length of the DMRS sequence, and the rest of the DMRS sequence is not transmitted.

In an embodiment of the present disclosure, determining the uplink DMRS format for demodulating the PUSCH includes if the UE knowing that the DMRS format comprises the comb by receiving higher layer signaling, the UE determining whether to use a DMRS with a comb according to the PUSCH scheduled by the UE, or determining whether to use the DMRS with the comb, and determining a RPF of a comb contained in the DMRS with the comb in response to determining to use the DMRS with the comb.

In an embodiment of the present disclosure, the UE determining whether to use the DMRS with the comb according to the PUSCH scheduled by the UE, or determining whether to use the DMRS with the comb, and determining the RPF of the comb contained in the DMRS with the comb in response to determining to use the DMRS with the comb includes if the number of PRBs contained in the PUSCH scheduled by the UE being not a multiple of N, the UE using a DMRS without a comb, and if the number of PRBs contained in the PUSCH scheduled by the UE being a multiple of N, the UE using the DMRS with the comb, where N is a positive integer, or, if the number of PRBs contained in the PUSCH scheduled by the UE being not a multiple of N and number of REs in frequency domain is smaller than M, the UE using a DMRS without a comb, and if the number of PRBs contained in the PUSCH scheduled by the UE being a multiple of N, or the number of PRBs contained in the PUSCH scheduled by the UE being not a multiple of N and number of REs in frequency domain is equal or larger than M, the UE using the DMRS with the comb, where N is a positive integer, or, if the number of PRBs contained in the PUSCH scheduled by the UE being not a multiple of N1, the UE using the DMRS without the comb, and if the number of PRBs contained in the PUSCH scheduled by the UE being a multiple of N1 but not a multiple of N2, the UE using the DMRS with the comb, the comb of which has a PRF being M1, and if the number of PRBs contained in the PUSCH scheduled by the UE being a multiple of N1 and also being a multiple of N2, the UE using the DMS with the comb, the comb of which has a RPF being M2, where N1, N2, M1 and M2 are positive integers, N2 is a multiple of N1, and M2 is a multiple of M1, or, if the UE knowing that a DMRS contains a comb and that a RPF of the comb is M1 by receiving higher layer signaling, if the number of PRBs contained in the PUSCH scheduled by the UE being not a multiple of N1, the UE using the DMRS without the comb, and if the PUSCH scheduled by the UE being a multiple of N1, the UE using the DMRS containing the comb, the RPF of which is M1, where N1 and M1 are positive integers, or, if the UE knowing that a DMRS contains a comb and that a RPF of the comb is M2 by receiving higher layer signaling, if the number of PRBs contained in the PUSCH scheduled by the UE being not a multiple of N2, the UE using the DMRS without the comb, and if the number of PRBs contained in the PUSCH scheduled by the UE being a multiple of N2, the UE using the DMRS that contains the comb, the RPF of which is M2, where N2 and M2 are positive integers, N2 is a multiple of N1, and M2 is a multiple of M1, or, if the UE knowing that a DMRS contains a comb by receiving higher layer signaling, the UE deciding whether to use the DMRS containing the comb and determining a RPF of the comb contained in the DMRS according to information bit instruction in UL DCI of the PUSCH scheduled by the UE, or, if the UE knowing that a DMRS contains a comb by receiving higher layer signaling, the UE deciding whether to use the DMRS containing the comb according to information bit instruction in UL DCI of the PUSCH scheduled by the UE, or, if the UE knowing that a DMRS contains a comb by receiving higher layer signaling, and knowing a RPF value by receiving higher layer signaling, the UE deciding whether to use the DMRS containing the comb and a comb value of the comb contained in the DMRS according to information bit instruction in UL DCI of the PUSCH scheduled by the UE, or, if the UE knowing that a DMRS contains a comb by receiving higher layer signaling, the UE determining whether to use the DMRS containing the comb, determining a RPF value of the comb contained in the DMRS, and determining combs with different RPF values according to information bit instruction in UL DCI of the PUSCH scheduled by the UE.

In accordance with another aspect of the present disclosure, an apparatus for transmitting the uplink demodulation reference signal is provided. The apparatus includes an uplink transmission format determination device configured to determine an uplink demodulation reference signal format for demodulating a PUSCH according to frequency-domain resources occupied by the PUSCH, in which, the demodulation reference signal format includes a comb occupied by a PUSCH demodulation reference signal sequence, the comb including subcarriers having specified intervals occupied by demodulation reference signals, wherein the specified intervals between the occupied subcarriers are same, and a transmission device configured to transmit uplink information and the demodulation reference signals on physical resources using the uplink DMRS format.

When the uplink demodulation reference signal format for demodulating the PUSCH is determined, a comb may be selected. The comb includes subcarriers having specified intervals occupied by demodulation reference signals, and the specified intervals between the occupied subcarriers are same. For example, a comb structure can be used to transmit demodulation reference signals. Demodulation reference signals with different combs are orthogonal, and when frequency-domain resources allocated to PUSCHs of different UEs overlap completely, demodulation reference signals using different combs of the UEs are orthogonal, and when frequency-domain resources allocated to PUSCHs of different UEs overlap incompletely, demodulation reference signals using different combs of the UEs are orthogonal. When the comb structure is used to transmit DMRSs, on one hand, the capacity of the DMRSs is increased, so that more UEs can multiplex the uplink physical resources, on the other hand, when the PUSCH frequency-domain resources allocated to different UEs overlap incompletely, and the UEs are going to multiplex the uplink physical resources, the DMRSs using different CSs are not orthogonal, but, the DMRSs using different combs are orthogonal, and more UEs can still multiplex the uplink physical resources. Hence, the present disclosure can increase the number of DMRSs that keep orthogonal when the PUSCH frequency-domain resources overlap incompletely, and thus can improve the multiplexing ratio of the uplink physical resources in a multi-user scenario.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 4 is a schematic diagram of a DMRS configuration of different UEs according to the related art;

FIG. 6 is a schematic diagram of sub-carriers occupied by UEs according to an embodiment of the present disclosure;

FIG. 7 is a schematic diagram of transmission resources of a UE according to an embodiment of the present disclosure;

FIG. 9 is a schematic diagram of the numbers of PRBs and Orthogonal cover code (OCCs) of different UEs according to an embodiment of the present disclosure.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Higher layer signaling in the present disclosure includes system information or user equipment (UE)-specific higher layer signaling, and it has this meaning in the following of the present disclosure, if not otherwise specified.

To achieve the objects of the present disclosure, the present disclosure provides a method for transmitting uplink demodulation reference signals.

Figure 1:
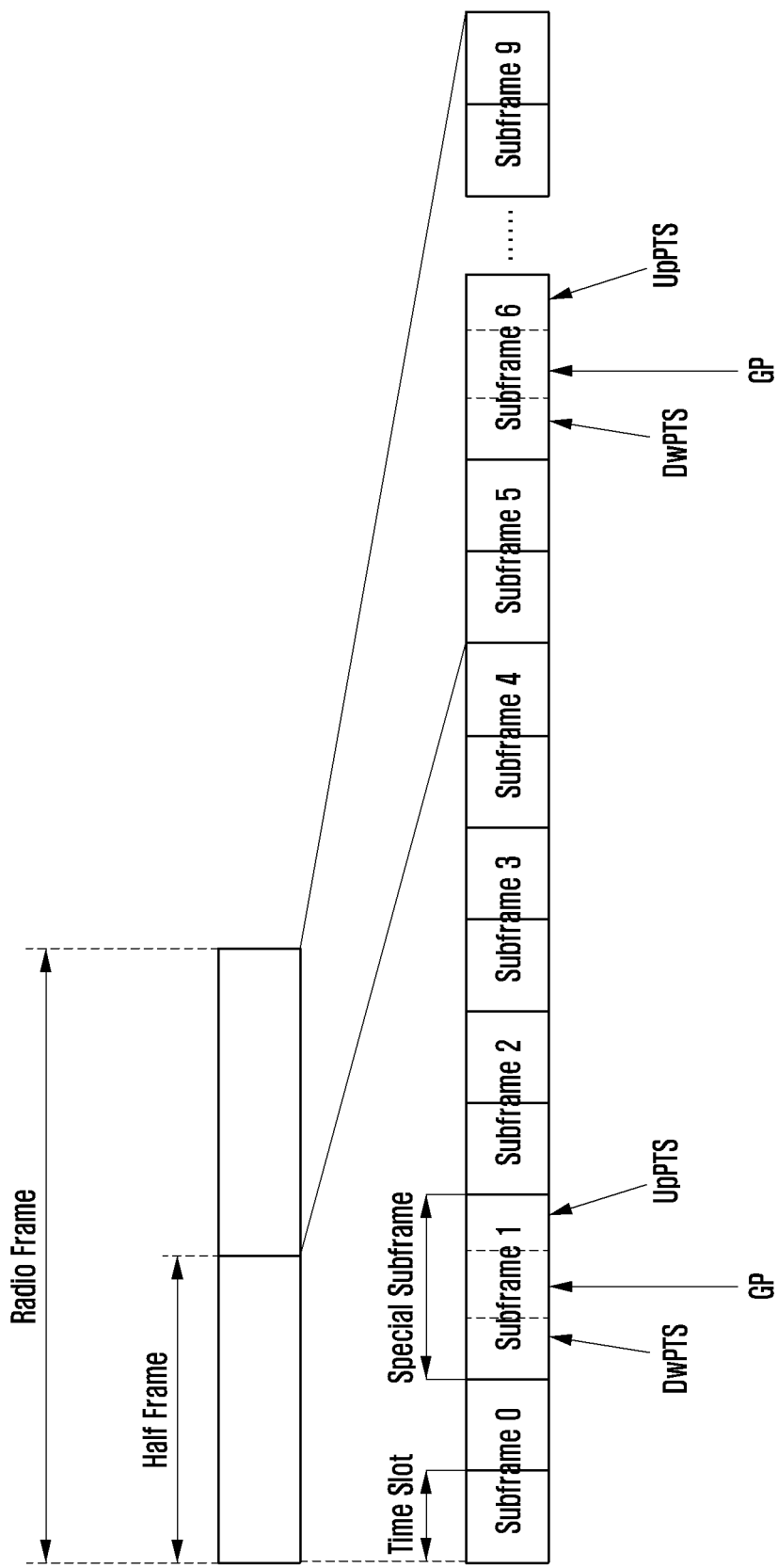
FIG. 1 is a schematic diagram of a long term evolution time division duplex (LTE TDD) frame structure according to the related art.
Figure 2:
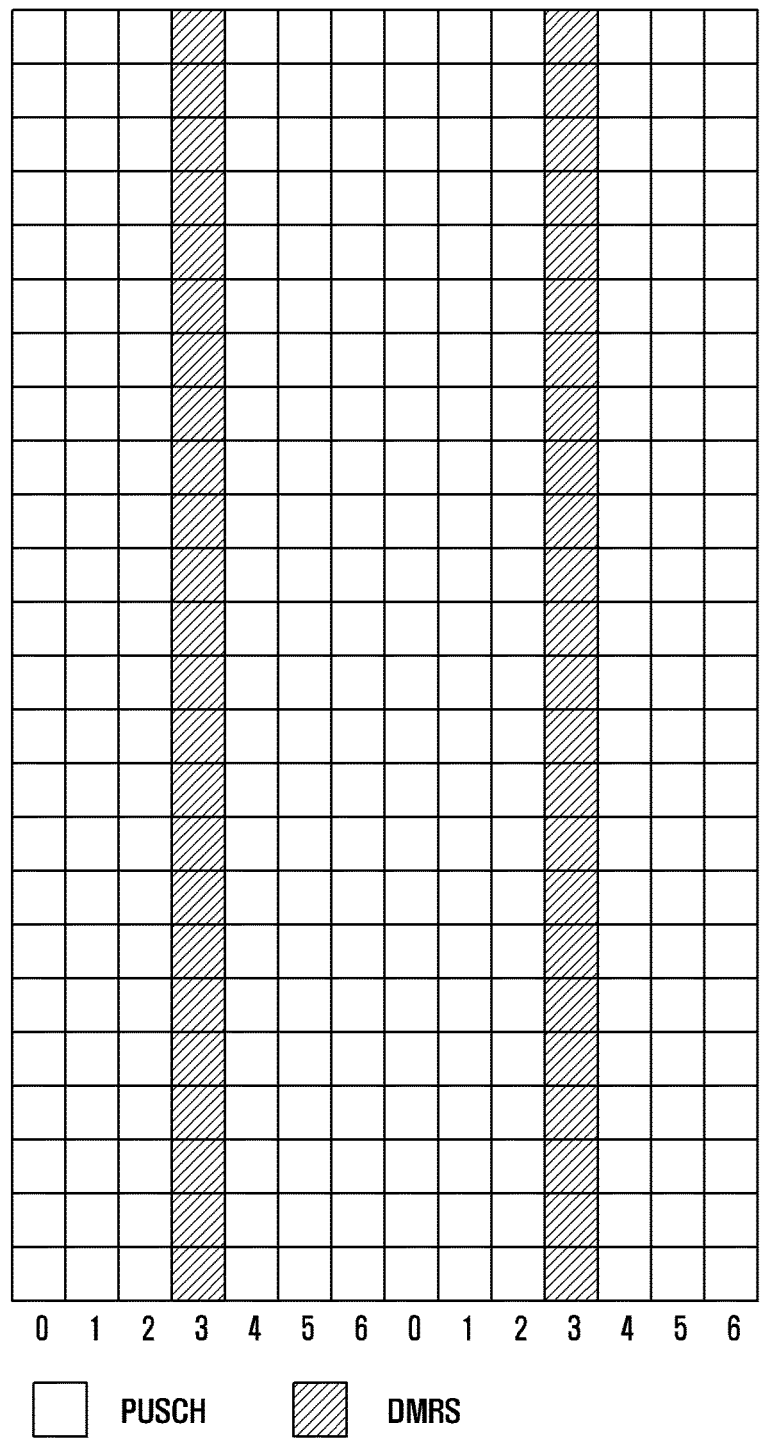
FIG. 2 is a schematic diagram of a physical uplink shared channel (PUSCH) and demodulation reference signals (DMRS) configuration according to the related art.
Figure 3:
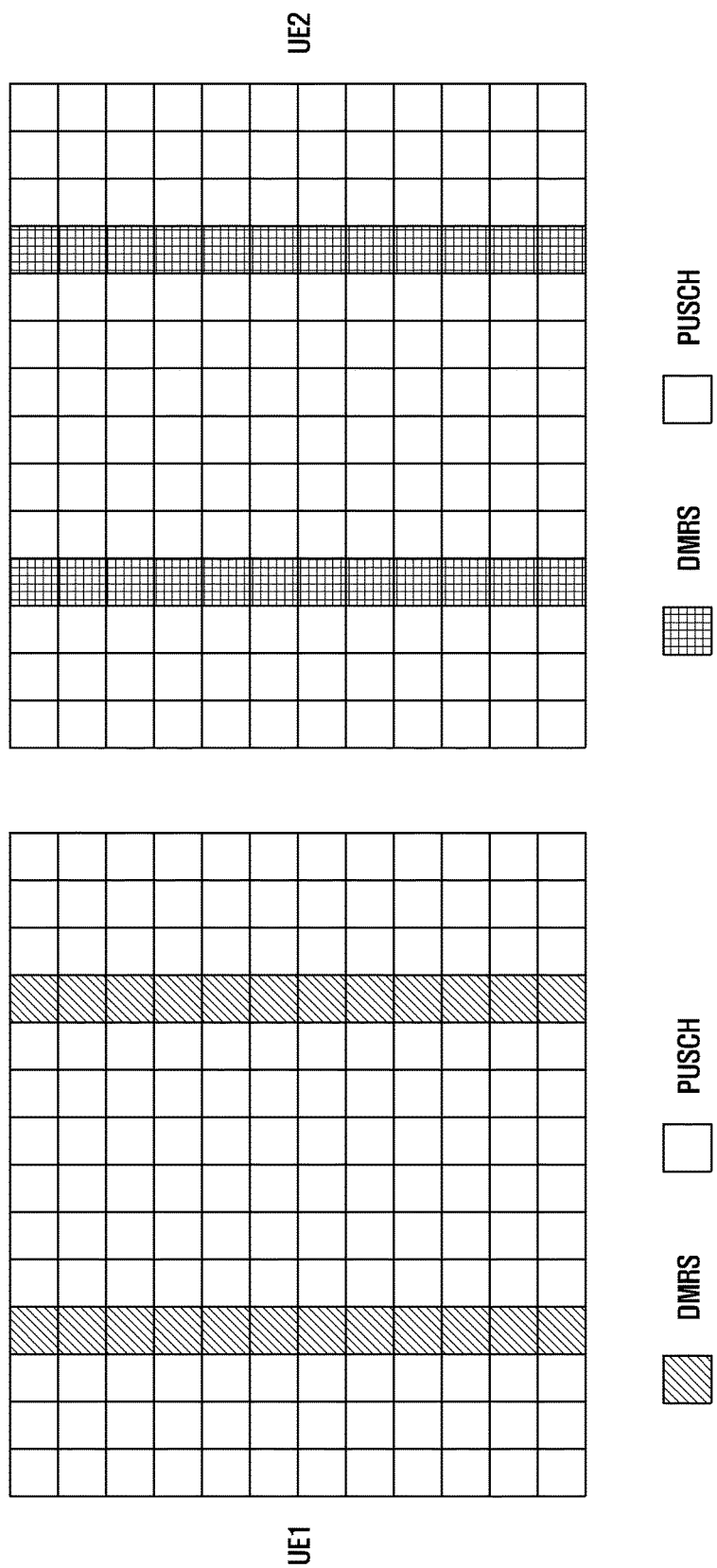
FIG. 3 is a schematic diagram of a DMRS configuration of different user equipment (UEs) according to the related art.
Figure 5:
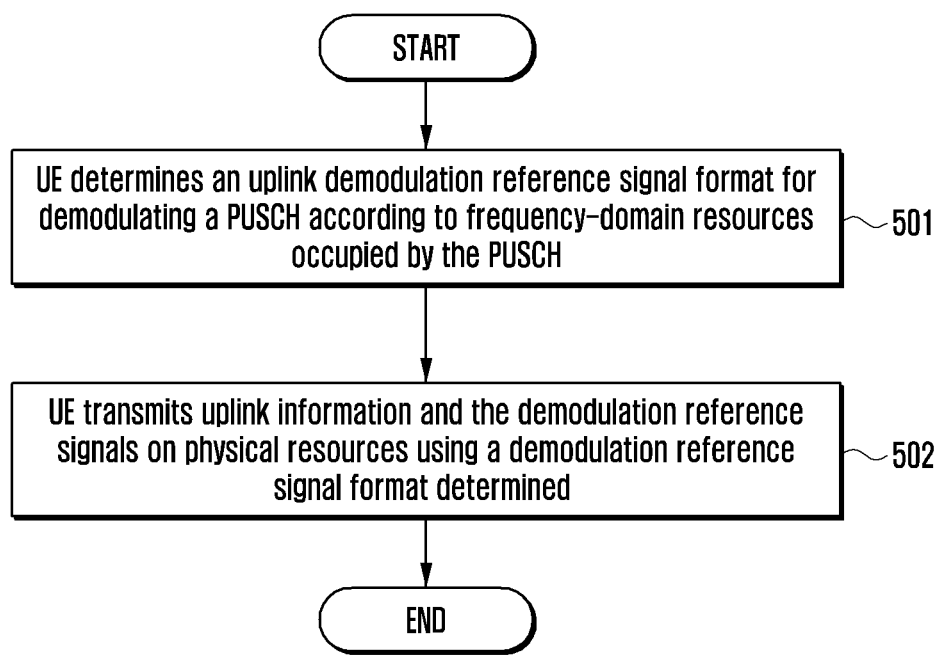
FIG. 5 is a schematic diagram of a flowchart of a method for transmitting uplink demodulation reference signals in according to an embodiment of the present disclosure.

FIG. 5 is a schematic diagram of a flowchart of a method for transmitting uplink demodulation reference signals according to an embodiment of the present disclosure.

Referring to FIG. 5, the method includes the following operations:

Operation 501: a UE determines an uplink demodulation reference signal format for demodulating a physical uplink shared channel (PUSCH) according to frequency-domain resources occupied by the PUSCH.

The frequency-domain resources include the number and positions of physical resource blocks (PRBs) occupied by the PUSCH.

The demodulation reference signal format for the PUSCH herein includes: a cyclic shift (CS) of a PUSCH demodulation reference signal sequence, and/or an orthogonal cover code (OCC) of the PUSCH demodulation reference signal sequence, and/or a comb occupied by the PUSCH demodulation reference signal sequence. For example, the demodulation reference signal format includes at least one of the CS, OCC, or comb.

The comb means that PUSCH demodulation reference signals do not occupy all same subcarriers allocated to the UE for PUSCH transmission, but occupy part of the subcarriers allocated to the UE for PUSCH transmission. The demodulation reference signals occupy subcarriers that have specified intervals, and the intervals between the subcarriers are the same. The intervals between the subcarriers are called repetition factor (RPF).

FIG. 6 is a schematic diagram of sub-carriers occupied by UEs according to an embodiment of the present disclosure. FIG. 7 is a schematic diagram of transmission resources of a UE according to an embodiment of the present disclosure.

Referring to FIG. 6, a schematic diagram of sub-carriers occupied by UEs, where RPF=4, is illustrated. For example, subcarriers, an interval between which is 4 and a comb of which is 0, are allocated to a UE as a demodulation reference signal, and a start subcarrier of the demodulation reference signals (DMRS) and a start subcarrier of a PUSCH are the same, subcarriers, an interval between which is 4 and a comb of which is 1, are allocated to another UE as a demodulation reference signal, and a start subcarrier of the DMRS equals to the start subcarrier of the PUSCH plus 1, subcarriers, an interval between which is 4 and a comb of which is 2, are allocated to another UE as a demodulation reference signal, and a start subcarrier of the DMRS equals to the start subcarrier of the PUSCH plus 2, and subcarriers, an interval between which is 4 and a comb of which is 3, are allocated to another UE as a demodulation reference signal, and a start subcarrier of the DMRS equals to the start subcarrier of the PUSCH plus 3. The demodulation reference signals having different combs are orthogonal, and when the PUSCH frequency-domain resources allocated to different UEs overlap completely, the demodulation reference signals using different combs of the UEs are orthogonal, and when the PUSCH frequency-domain resources allocated to different UEs overlap incompletely, the demodulation reference signals using different combs are still orthogonal. When DMRSs are transmitted using the comb structure, on the one hand, the capacity of the DMRSs is increased, so that more UEs can multiplex the uplink physical resources, on the other hand, when the PUSCH frequency-domain resources allocated to different UEs overlap incompletely, and UEs are going to multiplex the uplink physical resources, the DMRSs using different CSs are not orthogonal, but, the DMRSs using different combs are orthogonal, and more UEs can still multiplex the uplink physical resources.

Referring to FIG. 7, for DMRSs of a UE using the comb structure, channel estimation is performed for them using subcarriers having a specified interval, and then data demodulation is performed using a value of channel estimation. However, PUSCH data of the UE are transmitted on all the subcarriers, and on subcarriers between the DMRSs, channels of these subcarriers should be estimated out too, but there are no DMRS on these subcarriers, and therefore, DMRSs on these subcarriers should be obtained by performing interpolation using DMRSs on other subcarriers, as shown in FIG. 7.

Operation 502: the UE transmits uplink information and the demodulation reference signals on physical resources using the uplink DMRS format.

Corresponding to the above method in the present disclosure, the present disclosure also discloses an apparatus for transmitting uplink demodulation reference signals, including an uplink transmission format determination device configured to determine an uplink demodulation reference signal format for demodulating a PUSCH according to frequency-domain resources occupied by the PUSCH, in which, the demodulation reference signal format includes at least one of the following formats: a cyclic shift (CS) of a PUSCH demodulation reference signal sequence, an orthogonal cover code (OCC) of the PUSCH demodulation reference signal sequence, or a comb occupied by the PUSCH demodulation reference signal sequence, the comb is a demodulation reference signal occupies subcarriers having specified intervals, and the intervals between the occupied subcarriers are the same, and for demodulation reference signals using the comb format, channel estimation is performed for them using subcarriers having a specified interval, and then data demodulation is performed using a value of channel estimation, and a transmission device configured to transmit uplink information and the demodulation reference signals on physical resources using the uplink DMRS format. The technical solution of the present disclosure will be further described with reference to several embodiments in the following. For PUSCHs with or without control signaling scheduling, the method for transmitting demodulation reference signals in the present disclosure are different, which will be described respectively in the following.

Embodiment 1

In this embodiment 1, the method for transmitting demodulation reference signals when a PUSCH has control signaling scheduling will be described, and in this case the PUSCH is scheduled by control signaling uplink downlink control information (UL DCI).

Figure 8:
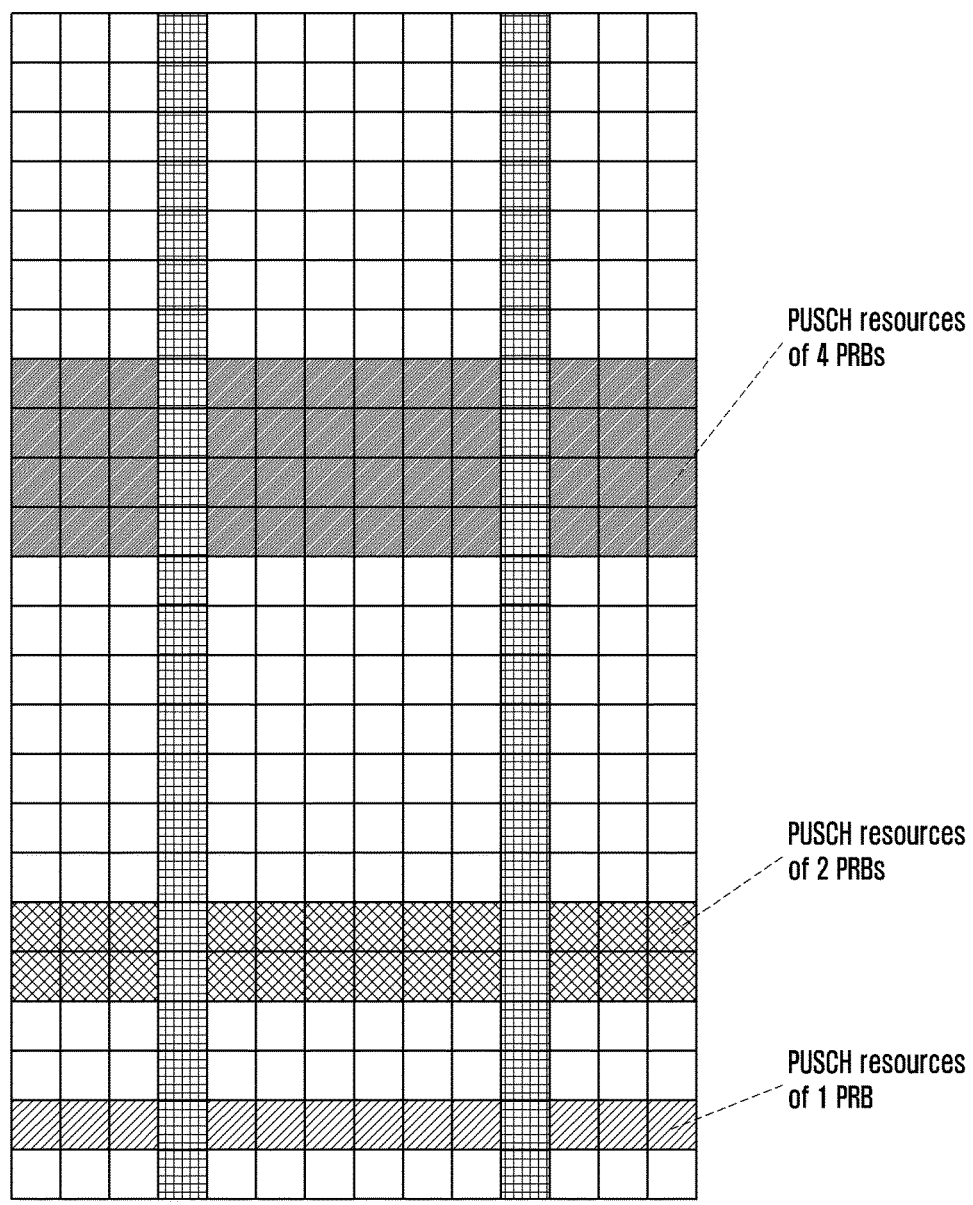
FIG. 8 is a schematic diagram of PUSCH resources of physical resource blocks (PRBs) of a UE according to an embodiment of the present disclosure.

FIG. 8 is a schematic diagram of PUSCH resources of physical resource blocks (PRBs) of a UE according to an embodiment of the present disclosure.

Referring to FIG. 8, there are two situations of allocating resources for UEs. A situation is that the numbers of PRBs of frequency-domain resources allocated for the UEs to transmit PUSCHs are related to positions of the frequency-domain resources, e.g., the numbers of PRBs used by the UEs at different positions of the frequency-domain resources being different, and in this way, either the frequency-domain resources used by the UEs to transmit the PUSCHs overlap completely, or the frequency-domain resources used by the UEs to transmit the PUSCHs do not overlap at all, and frequency-domain resources for transmitting PUSCHs, PRBs of which are 1, 2, and 4, do not overlap at all, but they are at different frequency-domain positions, referring to FIG. 8. In this situation, as long as one of the three factors, DMRS OCC, DMRS comb and DMRS CS, is different, DMRSs are orthogonal. Another situation is that the numbers of PRBs of frequency-domain resources allocated for the UEs to transmit PUSCHs are independent of positions of the frequency-domain resources, e.g., the numbers of PRBs that the UEs use at the same position of the frequency-domain resources may be same or different, and in this way, the frequency-domain resources used by the UEs to transmit PUSCHs may overlap completely, and the frequency-domain resources used by the UEs to transmit PUSCHs may overlap incompletely. In this situation, as long as one of the two factors, the DMRS OCC and DMRS comb, is different, DMRSs are orthogonal, and when CSs of DMRSs are different, the DMRSs may be orthogonal or not.

First, assume that the number of OCCs of a DMRS is M (M is a positive integer larger than or equal to 1, and it is configured by higher layer signaling (including system information or UE-specific higher layer signaling), or instructed by physical layer signaling, or determined according to presetting, e.g., M=1, 2, 4, 8, and the like), and a set of OCCs is {OCC0, ... OCCm, ..., OCCM−1}, which is determined according to presetting. The number of combs of the DMRS is N (N is a positive integer larger than or equal to 1, and it is configured by higher layer signaling (including system information or UE-specific higher layer signaling), or instructed by physical layer signaling, or determined according to presetting, e.g., N=1, 2, 4, 8, and the like), and the set of combs is {comb0, ..., combn, ..., combN−1}, and it is determined according to presetting. The number of the CSs of the DMRS is q (q is a positive integer larger than or equal to 1, and it is configured by higher layer signaling (including system information or UE-specific higher layer signaling), or instructed by physical layer signaling, or determined according to presetting, e.g., q=1, 2, 4, 8, 12, and the like), and the set of CSs is as shown in Table 9 or Table 10, or it is determined according to presetting.

In the present disclosure, the presetting may include a communication protocol that the evolved nodeB (eNB) and the UE both agree on, e.g., a third generation partnership project (3GPP) protocol.

In addition, it is described in the foregoing that three factors can increase the number of orthogonal DMRSs, but according to different channel situations and different requirements for the number of orthogonal DMRSs, there will not always be the three factors for a specific DMRS. A DMRS may include one of the three factors, i.e., the DMRS may include the OCC factor only, or the DMRS may include the CS factor only, or the DMRS may include the comb factor only, or a DMRS may include any two of the three factors, i.e., the DMRS includes the OCC and CS factors, or the DMRS includes the OCC and comb factors, or the DMRS includes the comb, and CS factors, or a DMRS may include all of the three factors, i.e., the DMRS includes the OCC, CS and comb factors. A UE knows how many factors and which factors are included in a DMRS of the UE by receiving higher layer signaling configuration, i.e., the UE in connecting state obtains the type of the DMRS by receiving higher layer signaling, and the type of the DMRS specifies how many factors and which factors are included in the DMRS. For example, as specified by an existing 3GPP protocol, if higher layer signaling configures that Activate-DMRS-with OCC is true, then a DMRS includes the OCC and CS factors, and if no higher layer signaling configures Activate-DMRS-with OCC, then a DMRS includes the CS factor only. Or how many factors and which factors being included in default state of a DMRS of a UE is determined according to a protocol, e.g., a DMRS of a PUSCH scheduled by DCI scrambled using a cell-radio network temporary identity (C-RNTI) only includes the CS factor. For example, when the comb factor is introduced, new higher layer signaling, Activate DMRS-with OCC and comb may be introduced, and if higher layer signaling configures that Activate-DMRS-with OCC and comb is true, then a DMRS includes the OCC, CS and comb factors, i.e., the DMRSs of the UEs using different CSs, the DMRSs of the UEs using different OCCs, and the DMRSs of the UEs using different combs, if higher layer signaling configures that Activate-DMRS-with OCC is true, and no higher layer signaling configures that Activate-DMRS-with OCC and comb is true, then a DMRS includes the CS and OCC factors, i.e., the DMRSs of the UEs using different CSs, the DMRSs of the UEs using different OCCs, and the DMRSs of the UEs using the same subcarriers with those used by the PUSCH, if no higher layer signaling configures that Activate-DMRS-with OCC and Activate-DMRS-with OCC and comb are true, then a DMRS includes the CS factor only. New higher layer signaling may be introduced to determine different numbers of factors and different factors included in a DMRSs. Or, new higher layer signaling, Activate-DMRS-with comb, is introduced, and if higher layer signaling configures that Activate-DMRS-with comb is true, then a DMRS includes the comb and CS factors.

In the following, several methods for transmitting DMRSs will be described, assuming that higher layer signaling configures that Activate-DMRS-with OCC and comb is true, and that a DMRS includes the OCC, CS and comb factors.

Method 1:

A UE may determine an OCC, and/or a CS, and/or a comb of a DMRS to be used by the UE by receiving higher layer signaling (including system information or UE-specific higher layer signaling) configuration or physical layer signaling instruction, or according to a protocol.

Specifically, the following three methods may be included.

The first method is that the UE determines a candidate set from a set of OCCs, a set of CSs and a set of combs to be used by the UE by receiving higher layer signaling (including system information or UE-specific higher layer signaling) or according to a protocol. Then the UE determines an OCC to be used from the set of OCCs, and/or determines a CS to be used from the set of CSs, and/or determines a comb to be used from the set of combs by receiving physical layer signaling.

The second method is that first the UE determines a candidate set from a set of OCCs, a set of CSs, and a possible set of combs to be used by the UE according to a protocol, and then determines an OCC to be used from the OCC set, and/or a CS to be used from the CS set, and/or a comb to be used from the set of combs by receiving higher layer signaling.

The third method is that the UE determines an OCC, and/or a CS, and/or a comb to be used by the UE by receiving higher layer signaling (including system information or UE-specific higher layer signaling) directly.

In the following, how to determine a specific OCC, and/or a CS, and/or a comb from a set of OCCs, a set of CSs and a set of combs will be described.

At first, a method for determining OCCs will be described, in which a set of OCCs is {OCC0, . . . , OCCm, . . . , OCCM−1}. For example, when the UE determines that the number of SC-FDMA or OFDM symbols to be used as a DMRS is 2 by receiving higher layer signaling or according to a protocol, that the number of OCCs is 2, and that the set of OCCs to be used by the UE is {[w(0) w(1)]=[1 1], [w(0) w(1)]=[1 −1]}, then higher layer signaling (including system information or UE-specific higher layer signaling) or physical layer signaling instructs the OCCs to be used by the UE. When the OCCs to be used by the UE are instructed by physical layer signaling, 1-bit signaling in downlink control information (DCI) will instruct the OCCs, and this 1-bit signaling is called OCC instruction signaling, as shown in Table 1. The UE determines the OCCs by receiving OCC instruction signaling.

TABLE 1

| OCC instruction signaling and OCC mapping relationship | | |
|---|---|---|
| OCC instruction signaling value | 0 | 1 |
| OCC | [1 1] | [1 −1] |

Or, for example, when the UE determines that the number of SC-FDMA or OFDM symbols to be used as the DMRS is 4 by receiving higher layer signaling or according to a protocol, that the number of OCCs is 4, and that the set of OCCs [w(0) w(1) w(2) w(3)] to be used by the UE is {[1 1 1 1],[1 1 −1 −1],[1 −1 −1 1],[1 −1 1 −1]}, then 2-bit signaling in downlink control information (DCI) will be used to instruct the OCCs, and this 2-bit signaling is called OCC instruction signaling, as shown in Table 2. The UE determines the OCCs by receiving OCC instruction signaling.

TABLE 2

| OCC instruction signaling and OCC mapping relationship | | |
|---|---|---|
| OCC instruction signaling value | 00 | 01 | 10 |
| OCC | [1 1 1 1] | [1 1 −1 −1] | [1 −1 −1 1] |

Or, for example, when the UE determines that the number of SC-FDMA or OFDM symbols to be used as the DMRS is 4 by receiving higher layer signaling or according to a protocol, then the possible number of OCCs is 4. But when the UE determines that the number of OCCs to be used by the UE is 2 by receiving higher layer signaling, and that the set of OCCs [w(0) w(1) w(2) w(3)] to be used by the UE is {[1 1 1 1],[1 1 −1 −1]}, 1-bit signaling in downlink control information (DCI) will instruct the OCCs, and this 1-bit signaling is called OCC instruction signaling, as shown in Table 3. The UE obtains the OCCs by receiving OCC instruction signaling.

TABLE 3

| OCC instruction signaling and OCC mapping relationship | | |
|---|---|---|
| OCC instruction signaling value | 0 | 1 |
| OCC | [1 1 1 1] | [1 1 −1 −1] |

When the number of OCCs in the set of OCCs to be used as the DMRS is other numbers, a similar method may be used to determine the set of OCCs first, and then determine the OCCs to be used by the UE by being instructed by higher layer signaling (including system information or UE-specific higher layer signaling) or physical layer signaling. When the OCCs to be used by the UE are instructed by physical layer signaling, and by being instructed by OCC instruction signaling in DCI, the UE obtains the OCCs by receiving OCC instruction signaling.

FIG. 9 is a schematic diagram of the numbers of PRBs and orthogonal cover codes (OCCs) of different UEs according to an embodiment of the present disclosure.

Referring to FIG. 9, an OCC is determined related to the number of PRBs allocated to a UE for a PUSCH. For example, a set of PRB numbers possibly to be allocated to the UE for the PUSCH is determined according to higher layer signaling (including system information or UE-specific higher layer signaling) or according to a protocol (for example, PRB numbers allocated possibly to the UE for the PUSCH are 1, 2, 4, and 8), then an OCC is determined for a PUSCH demodulation reference signal of each PRB number, for example, determining an OCC for a PUSCH demodulation reference signal of each PRB number by a protocol or by higher layer signaling (including system information or UE-specific higher layer signaling, which are referred to as higher layer signaling system information or UE-specific higher layer signaling in the following). For example, when the PRB numbers allocated possibly to the UE for the PUSCH are 1, 2, 4, and 8, and available OCCs are {[1 1 1 1],[1 1 −1 −1],[1 −1 −1 1],[1 −1 1 −1]}, a PRB number and OCC mapping relationship is as shown in Table 4. In this way, when PRB numbers of PUSCH frequency-domain resources allocated to different UEs are different, and start PRBs of PUSCH resources allocated to the UEs are same, by allocating different OCCs to UEs with different PRB numbers, it is ensured that when the PRB numbers of PUSCH frequency-domain resources allocated to the UEs are different, DMRSs of the UEs are orthogonal, as shown in FIG. 9.

TABLE 4

| PRB number and OCC mapping relationship | | | | |
|---|---|---|---|---|
| PRB number | 1 | 2 | 4 | 8 |
| OCC | [1 1 1 1] | [1 1 −1 −1] | [1 −1 −1 1] | [1 −1 1 −1} |

Figure 10:
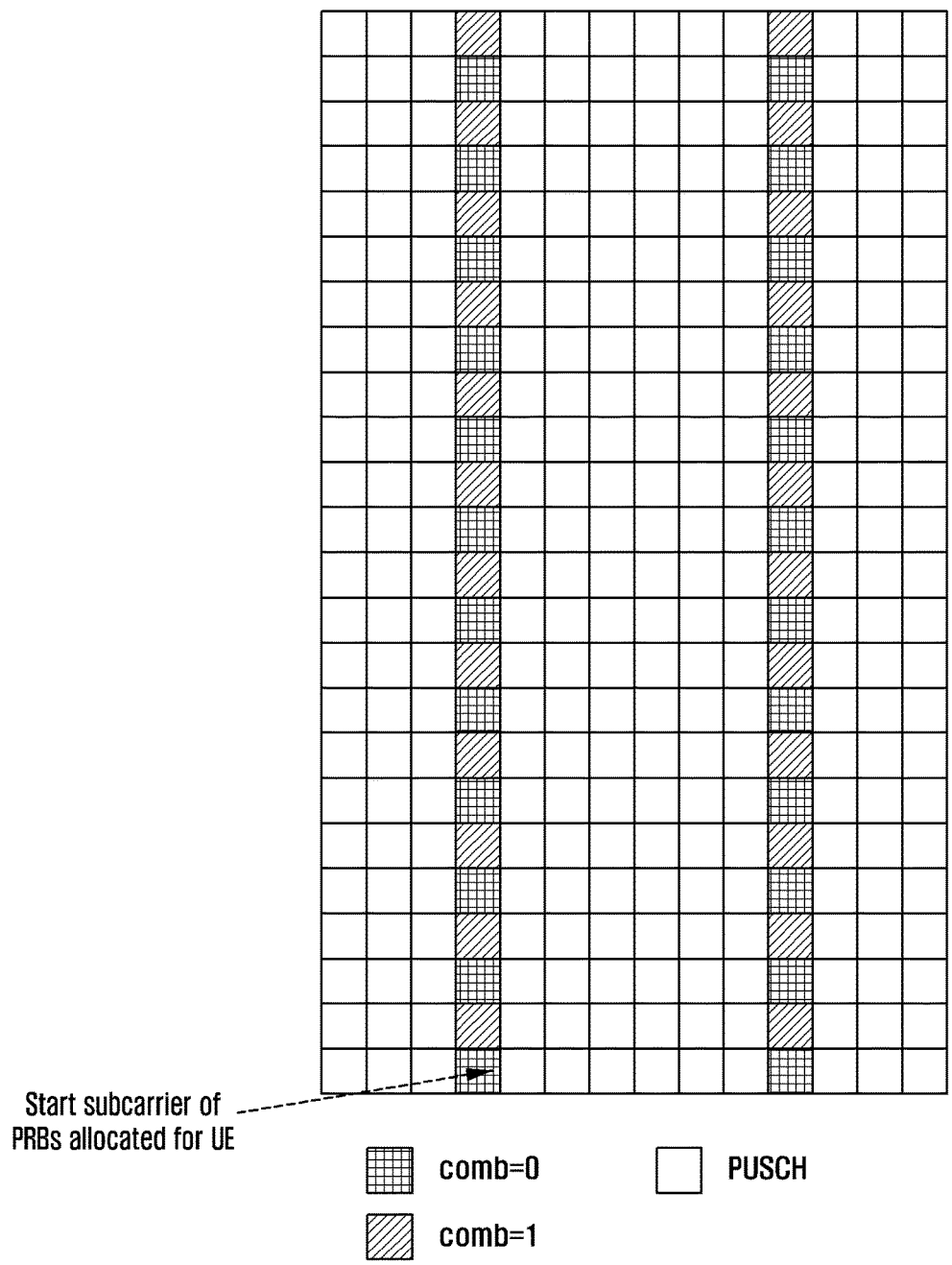
FIG. 10 is a schematic diagram of start subcarriers allocated to a UE according to an embodiment of the present disclosure.

FIG. 10 is a schematic diagram of start subcarriers allocated to a UE according to an embodiment of the present disclosure.

Referring to FIG. 10, a method for determining combs will be described, in which a set of combs is {comb0, . . . , combn, . . . , combN−1}. For example, when a UE determines that the number of combs used for DMRSs is 2 and that the set of combs to be used by the UE is {0, 1}, by receiving higher layer signaling or by a protocol, then higher layer signaling (including system information or UE-specific higher layer signaling) or physical layer signaling instructs a comb to be used by the UE. For example, when a repetition factor (RPF) of the DMRSs is 2, there are two combs, i.e., comb being equal to 0 and comb being equal to 1, higher layer signaling (including system information or UE-specific higher layer signaling) or physical layer signaling instructs a comb to be used by the UE. When a comb to be used by the UE equals to 0, subcarriers occupied by the UE are subcarriers, an interval between which is 2, on PRBs allocated for PUSCH of the UE, and a start subcarrier of a DMRS is a start subcarrier of the PRBs allocated for PUSCH of the UE, when a comb equals to 1, subcarriers occupied by the UE are subcarriers, an interval between which is 2, on PRBs allocated for PUSCH allocated of the UE, and a start subcarrier of a DMRS is the start subcarrier of the PRBs allocated for PUSCH of the UE plus 1, as shown in FIG. 10. When the comb used by the UE is instructed by physical layer signaling, 1-bit signaling in downlink control information (DCI) will instruct the comb, this 1-bit signaling is called comb instruction signaling, a comb instruction signaling and comb mapping relationship is as shown in Table 5. The UE determines the comb to be used by the UE by receiving comb instruction signaling.

TABLE 5 comb instruction signaling and comb mapping relationship

| comb instruction signaling value | 0 | 1 |
|---|---|---|
| comb | 0 | 1 |

Or, for example, when the UE determines that the number of combs to be used for DMRSs is 4 and the set of combs to be used by the UE is {0, 1, 2, 3} by receiving higher layer signaling or by a protocol, then higher layer signaling (including system information or UE-specific higher layer signaling) or physical layer signaling instructs a comb to be used by the UE. When the comb equals to 0, the subcarriers occupied by the UE are subcarriers, an interval between which is 4, of the PRBs allocated for PUSCH by the UE, and a start subcarrier of the DMRS is a start subcarrier of the PRBs allocated for PUSCH of the UE. When the comb equals to 1, subcarriers occupied by the UE are subcarriers, an interval between which is 4, of the PRBs allocated for PUSCH of the UE, and a start subcarrier of the DMRS is the start subcarrier of the PRBs allocated for PUSCH of the UE plus 1, when the comb equals to 2, the subcarriers occupied by the UE are subcarriers, an interval between which is 4, of the PRBs allocated for PUSCH of the UE, and a start subcarrier of the DMRS is the start subcarrier of the PRBs allocated for PUSCH of the UE plus 2, and when the comb equals to 3, the subcarriers occupied by the UE are subcarriers, an interval between which is 4, of the PRBs allocated for PUSCH of the UE, and a start subcarrier of the DMRS is the start subcarrier of the PRBs allocated of the UE plus 3.

When the comb to be used by the UE is instructed by physical layer signaling, the comb is instructed by 2-bit signaling in downlink control information (DCI). This 2-bit signaling is called comb instruction signaling, and a comb instruction signaling and comb mapping relationship is as shown in Table 6. The UE determines the comb to be used by the UE by receiving comb instruction signaling directly.

TABLE 6 comb instruction signaling and comb mapping relationship

| comb instruction signaling value | 00 | 01 | 10 | 11 |
|---|---|---|---|---|
| Comb | 0 | 1 | 2 | 3 |

Or, for example, the UE determines that the repetition factor (RPF) to be used for DMRSs is 4, that the number of combs to be used by the DMRSs of the UE is 2, and that a set of combs to be used by the UE is {0, 2} by receiving higher layer signaling or by a protocol. Then higher layer signaling (including system information or UE-specific higher layer signaling) or physical layer signaling instructs a comb to be used by a DMRS of the UE. When the comb equals to 0, subcarriers occupied by the UE are subcarriers, intervals between which is 4, of the PRBs allocated for PUSCH of the UE, and a start subcarrier of the DMRS is the start subcarrier of the PRBs allocated for PUSCH of the UE. When the comb equals to 2, the subcarriers occupied by the UE are subcarriers, an interval between which is 4, of PRBs allocated for PUSCH of the UE, and the start subcarrier of the DMRS is the start subcarrier of the PRBs allocated for PUSCH of the UE plus 2.

When the comb to be used by the UE is instructed by physical layer signaling, 1-bit signaling in downlink control information (DCI) will instruct the comb, this 1-bit signaling is called comb instruction signaling, and a comb instruction signaling and comb mapping relationship is as shown in Table 7. The UE determines a comb to be used by the UE by receiving comb instruction signaling.

TABLE 7 comb instruction signaling and comb mapping relationship

| comb instruction signaling value | 0 | 1 |
|---|---|---|
| comb | 0 | 2 |

When the number of combs to be used for the DMRSs is other numbers, a similar method may be used to determine a set of combs first, and then instruct a comb by comb instruction signaling in DCI.

Or the comb is determined related to the number of PRBs allocated for PUSCH of the UE. For example, a set of PRB numbers allocated possibly for PUSCH of the UE is determined by higher layer signaling (including system information or UE-specific higher layer signaling) or by a protocol (for example, the PRB numbers allocated possibly by the UE is 1, 2, 4, and 8), then a comb is determined for a PUSCH demodulation reference signal of each PRB number, for example, determining a comb for a PUSCH demodulation reference signal of each PRB number in the set of PRB numbers by a protocol or by higher layer signaling (including system information or UE-specific higher layer signaling). For example, when the PRB number that may allocated to the PUSCH of the UE is 1, 2, 4, and 8, and available combs for DMRSs are 0, 1, 2, and 3, the PRB number and comb mapping relationship is as shown in Table 8. In this way, when the number of PRBs of frequency-domain resources allocated to different UEs for PUSCH are different, and start PRBs of the PUSCH frequency-domain resources allocated to the UEs are the same, it is ensured that when the numbers of PRBs of frequency-domain resources allocated to the UE for PUSCH are different, DMRSs of the UEs are orthogonal by allocating different combs to the UEs with different PRB numbers.

TABLE 8

PRB number and comb mapping relationship

| PRB number | 1 | 2 | 4 | 8 |
|---|---|---|---|---|
| OCC | 0 | 1 | 2 | 3 |

Then, a method for determining CSs will be described. For example, when the number of CSs of DMRSs is 8, a CS to be used by a DMRS of a UE is instructed by higher layer signaling (including system information or UE-specific higher layer signaling) or physical layer signaling. When the CS to be used by the DMRS of the UE is instructed by physical layer signaling, 3-bit signaling in downlink control information (DCI) will instruct the CS, this 3-bit signaling is called CS instruction signaling, as shown in Table 9. The meaning represented by $n_{DMRS}^{(2)}$ may be seen in the version V8.9.0 (2009-12) of 3GPP TS 36.211. Or, when the number of CSs of the DMRSs is 12, the CS to be used by the DMRS of the UE is instructed by higher layer signaling (including system information or UE-specific higher layer signaling) or physical layer signaling. When the CS to be used by the DMRS of the UE is instructed by physical layer signaling, 4-bit signaling in downlink control information (DCI) will instruct the CS, and this 4-bit signaling is called CS instruction signaling, as shown in Table 10. The meaning of $n_{DMRS}^{(2)}$ may be seen in the version V8.9.0 (2009-12) of 3GPP TS 36.211.

TABLE 9

CS instruction signaling and $n_{DMRS}^{(2)}$ mapping relationship

| CS instruction signaling value | $n_{DMRS}^{(2)}$ |
|---|---|
| 000 | 0 |
| 001 | 6 |
| 010 | 3 |
| 011 | 4 |
| 100 | 2 |
| 101 | 8 |
| 110 | 10 |
| 111 | 9 |

TABLE 10

CS instruction signaling and $n_{DMRS}^{(2)}$ mapping relationship

| CS instruction signaling value | $n_{DMRS}^{(2)}$ |
|---|---|
| 0000 | 0 |
| 0001 | 1 |
| 0010 | 2 |
| 0011 | 3 |
| 0100 | 4 |
| 0101 | 5 |
| 0110 | 6 |
| 0111 | 7 |
| 1000 | 8 |
| 1001 | 9 |
| 1010 | 10 |
| 1011 | 11 |
| 1100~1111 | Reserved |

When the number of CSs used for the DMRSs is other numbers, a similar method may be used to determine a set of CSs first, and then instruct a CS by CS instruction signaling in DCI. The UE determines the CS by receiving CS instruction signaling.

Method 2:

First, a UE determines a set of combinations of any two or three factors of the OCC, CS and comb in a DMRS by being configured by higher layer signaling or by a protocol, then determines a combination of OCC, CS and comb from the set of combinations by being configured by higher layer signaling or by being instructed by physical layer signaling.

In the above method 2, the first method for determining the OCC, CS and comb is that:

Determining a set of combinations of OCC and comb by being configured by higher layer signaling or by a protocol, determining a combination of OCC and comb to be used by a DMRS of the UE from the set of the combinations of OCC and comb by being configured by higher layer signaling or by being instructed by physical layer signaling. A CS to be used by the DMRS of the UE is configured by higher layer signaling separately, or instructed by physical layer signaling separately, or determined by a protocol separately, and a determining method thereof is the same as the method for determining the CS in the Method 1.

It is because that when the PUSCH frequency-domain resources allocated to the UEs overlap incompletely, and DMRSs of different UEs use different OCCs or combs, the DMRSs of the different UEs are orthogonal, when the PUSCH frequency-domain resources allocated to the UEs overlap incompletely, and the DMRSs of the different UEs use different CSs, the DMRSs of the different UEs are not orthogonal, and when the PUSCH frequency-domain resources allocated to the UEs overlap completely, and the DMRSs of different UEs use different OCCs or combs or CSs, the DMRSs of the different UE are orthogonal. In this way, when there are PUSCH frequency-domain resources allocated to multiple UEs, one part of PUSCH frequency-domain resources allocated to the UEs overlap completely, and the other part of PUSCH frequency-domain resources allocated to the UEs overlap incompletely. For DMRSs of UEs, PUSCH frequency-domain resources allocated to which overlap completely, the same combination of OCC and comb may be used, and different CSs may be allocated for DMRSs of different UEs, and in this way, the DMRSs of the different UEs are orthogonal, for UEs, to which PUSCH frequency-domain resources allocated overlap incompletely, DMRSs of different UEs may be allocated with different CSs, and in this way, the DMRSs of the different UEs are not orthogonal, and the DMRSs of the UEs may use different combinations of OCC and comb, and in this way, the DMRSs of the different UEs are orthogonal. A set of OCCs is {OCC0, . . . , OCCm, . . . , OCCM−1}, where M is the sum of the set of OCCs, and a set of combs is {comb0, . . . , combn, . . . , combN−1}, where N is the sum of the set of combs. And a set of combinations of OCC and comb is {(OCC0, comb0), . . . , (OCCm, combn), . . . , (OCCM−1, combN−1)}, where the number of combinations of OCC and comb is M*N, and the set of combinations of OCC and comb to be used by the DMRSs of the UEs may be {(OCC0, comb0), . . . , (OCCm, combn), . . . , (OCCM−1, combN−1)}, or a subset of it. The sum of the set of OCCs is M, the sum of the set of combs is N, or the set of combinations of OCC and comb to be used by the DMRS of the UE is determined by a protocol, or configured by higher layer signaling. When the sum M of the set of OCCs, the sum N of the set of combs, or the set of combinations of OCC and comb to be used by the DMRSs of the UEs is configured by a protocol or higher layer signaling or physical layer signaling.

For example, a UE determines that a set of OCCs is {[1 1],[1 −1]}, a set of combs is {0, 1}, and a set of combinations of OCC and comb is as shown in Table 11 by receiving higher layer signaling or by a protocol. Or, the UE determines that a set of OCCs is {[1 1],[1 −1]}, a set of combs is {0, 1, 2, 3}, and a set of combination of OCC and combs is as shown in Table 12 by receiving higher layer signaling or by a protocol. In this way, since the set of combinations of OCC and comb is obtained, a specific combination of OCC and comb to be used by a DMRS of the UE will be configured by higher layer signaling or instructed by physical layer signaling. When the specific combination of OCC and comb is instructed by physical layer signaling, it may be instructed by instruction signaling of the combination of OCC and comb in uplink DCI, and when there are 4 combinations of OCC and comb in the set of combinations of OCC and comb, they may be instructed by 2-bit instruction signaling of the combination of OCC and comb, and a specific instructing method is as shown in Table 13. The UE determines a combination of OCC and comb to be used by a DMRS of the UE by receiving instruction signaling of the combination of OCC and comb, when there are 8 combinations of OCC and comb in the set of combinations of OCC and comb, they are instructed by a 3-bit instruction signaling of the combination OCC and comb. A specific instructing method is as shown in Table 14. The UE obtains a combination of OCC and comb to be used by the DMRS of the UE by receiving instruction signaling of the combination of OCC and comb.

TABLE 11 combination of OCC and comb

| combination index of OCC and comb | comb | OCC |
|---|---|---|
| 0 | 0 | [1 1] |
| 1 | 1 | [1 −1] |
| 2 | 0 | [1 1] |
| 3 | 1 | [1 −1] |

TABLE 12 combination of OCC and comb

| combination of OCC and comb | comb | OCC |
|---|---|---|
| 0 | 0 | [1 1] |
| 1 | 1 | [1 −1] |
| 2 | 2 | [1 1] |
| 3 | 3 | [1 −1] |
| 4 | 0 | [1 1] |
| 5 | 1 | [1 −1] |
| 6 | 2 | [1 1] |
| 7 | 3 | [1 −1] |

TABLE 13 combination of OCC and comb and combination of OCC and comb instruction signaling value mapping relationship

| combination of OCC and comb instruction signaling value | comb | OCC |
|---|---|---|
| 00 | 0 | [1 1] |
| 01 | 1 | [1 −1] |
| 10 | 0 | [1 1] |
| 11 | 1 | [1 −1] |

TABLE 14 combination of OCC and comb and combination of OCC and comb instruction signaling value mapping relationship

| combination of OCC and comb | comb | OCC |
|---|---|---|
| 000 | 0 | [1 1] |
| 001 | 1 | [1 −1] |
| 010 | 2 | [1 1] |
| 011 | 3 | [1 −1] |
| 100 | 0 | [1 1] |
| 101 | 1 | [1 −1] |

TABLE 14-continued combination of OCC and comb and combination of OCC and comb instruction signaling value mapping relationship

| combination of OCC and comb | comb | OCC |
|---|---|---|
| 110 | 2 | [1 1] |
| 111 | 3 | [1 −1] |

Or, a UE determines, by receiving higher layer signaling or by a protocol, that a set of OCCs is {[1 1],[1 −1]}, a set of combs is {0, 1, 2, 3}, and a set of OCCs possibly to be used by DMRSs of the UE is {[1 1],[1 −1]}, a set of combs possibly to be used by the DMRSs of the UE is {0, 2}, and a set of combinations of OCC and comb possibly to be used by the DMRS of the UE is as shown in Table 15. In this way, after the set of combinations of OCC and comb possibly to be used by the DMRSs of the UE is obtained, a specific combination of OCC and comb to be used by the DMRSs of the UE will be instructed by higher layer signaling or physical layer signaling. When the specific combination of OCC and comb is instructed by physical layer signaling, it may be instructed by instruction signaling of the combination of OCC and comb in uplink DCI, and when there are 4 combinations of OCC and comb in the set of combinations of OCC and comb possibly to be used by the DMRSs of the UE, they are instructed by 2-bit instruction signaling of the combination of OCC and comb, a specific instructing method is as shown in Table 16. The UE obtains a combination of OCC and comb to be used by the DMRS of the UE by receiving instruction signaling of the combination of OCC and comb.

TABLE 15 combination of OCC and comb

| combination of OCC and comb | comb | OCC |
|---|---|---|
| 0 | 0 | [1 1] |
| 1 | 2 | [1 −1] |
| 2 | 0 | [1 1] |
| 3 | 2 | [1 −1] |

TABLE 16 combination of OCC and comb and combination of OCC and comb instruction signaling value mapping relationship

| combination of OCC and comb | comb | OCC |
|---|---|---|
| 00 | 0 | [1 1] |
| 01 | 2 | [1 −1] |
| 10 | 0 | [1 1] |
| 11 | 2 | [1 −1] |

In the above method 2, the second method for determining OCC, CS and comb is that determining a set of combinations of OCC, comb, and CS by being configured by higher layer signaling or by a protocol, determining a combination of OCC, comb, and CS to be used by the DMRS of the UE from the set of the combinations of OCC, comb, and CS by being configured by higher layer signaling or instructed by physical layer signaling.

For example, the UE determines, by receiving higher layer signaling or by a protocol, that the set of OCCs is {OCC0, ..., OCCm, ..., OCCM-1}, where M is the sum of the set of OCCs, the set of combs is {comb0, ..., combn, ..., combN-1}, where N is the sum of the set of combs, and the set of CSs is as shown in Table 9 or 10, or the CS number is other numbers beyond the CS number in Table 9 or 10, then the set of CSs is {CS0, ..., CSq, ..., CSQ-1}, where Q is the sum of the set of CSs. In the following, the set of combinations of OCC, comb, and CS will be described.

A) a method for determining the set of combinations of OCC, CS and comb is that the number of combinations in the set of combinations of the 3 factors: OCC, CS and comb is M*N*Q, and the set of combinations of the 3 factors is {(OCC0, comb0, CS0), ..., (OCCm, combn, CSq), ..., (OCCM-1, combN-1, CSQ-1)}. If the UE obtains a combination of OCC, CS and comb to be used by the DMRS of the UE by receiving physical layer signaling instruction, the UE obtains the combination of OCC, CS and comb to be used by the DMRS of the UE by receiving a combination of OCC, comb, and CS instruction signaling in uplink DCI. The number of bits used for instruction signaling of the combination of OCC, comb, and CS may be [log 2(M*N*Q)]. For example, M equals to 2, the set of OCCs is {[1 1],[1 −1]}, N equals to 2, the set of combs is {0, 1}, Q equals to 4, and the set of CSs is {0, 3, 6, 9}. When the number of bits used for instruction signaling of the combination of OCC, comb, and CS is: [log 2(2*2*4)]=4, a mapping relationship of instruction signaling values of the combination of OCC, comb, and CS and combinations of OCC, comb, and CS is as shown in Table 17. A combination of OCC, comb, and CS to be used by the DMRS of the UE is obtained by receiving instruction signaling of the combination of OCC, comb, and CS.

TABLE 17 combination of OCC, comb, and CS and instruction signaling of the combination of OCC, comb, and CS mapping relationship

| combination of OCC, comb, and CS instruction signaling value | OCC | comb | CS |
|---|---|---|---|
| 0000 | [1 1] | 0 | 0 |
| 0001 | [1 −1] | 0 | 0 |
| 0010 | [1 1] | 1 | 0 |
| 0011 | [1 −1] | 1 | 0 |
| 0100 | [1 1] | 0 | 3 |
| 0101 | [1 −1] | 0 | 3 |
| 0110 | [1 1] | 1 | 3 |
| 0111 | [1 −1] | 1 | 3 |
| 1000 | [1 1] | 0 | 6 |
| 1001 | [1 −1] | 0 | 6 |
| 1010 | [1 1] | 1 | 6 |
| 1011 | [1 −1] | 1 | 6 |
| 1100 | [1 1] | 0 | 9 |
| 1101 | [1 −1] | 0 | 9 |
| 1110 | [1 1] | 1 | 9 |
| 1111 | [1 −1] | 1 | 9 |

Or, for example, M equals to 2, the set of OCCs is {[1 1],[1 −1]}, N equals to 4, the set of combs is {0, 1, 2, 3}, Q equals to 4, and the set of CSs is {0, 3, 6, 9}. The number of bits used for instruction signaling of the combination of OCC, comb, and CS may be [log 2(2*4*4)]=5, then a mapping relationship between the instruction signaling values of the combination of OCC, comb, and CS and combinations of OCC, comb, and CS is as shown in Table 18. The combination of OCC, comb, and CS to be used by the DMRS of the UE will be obtained by receiving instruction signaling of the combination of OCC, comb, and CS.

TABLE 18 combination of OCC, comb, and CS and instruction signaling value of the combination of OCC, comb, and CSs mapping relationship

| combination of OCC, comb, and CS instruction signaling value | OCC | comb | CS |
|---|---|---|---|
| 00000 | [1 1] | 0 | 0 |
| 00001 | [1 −1] | 0 | 0 |
| 00010 | [1 1] | 1 | 0 |
| 00011 | [1 −1] | 1 | 0 |
| 00100 | [1 1] | 0 | 3 |
| 00101 | [1 −1] | 0 | 3 |
| 00110 | [1 1] | 1 | 3 |
| 00111 | [1 −1] | 1 | 3 |
| 01000 | [1 1] | 0 | 6 |
| 01001 | [1 −1] | 0 | 6 |
| 01010 | [1 1] | 1 | 6 |
| 01011 | [1 −1] | 1 | 6 |
| 01100 | [1 1] | 0 | 9 |
| 01101 | [1 −1] | 0 | 9 |
| 01110 | [1 1] | 1 | 9 |
| 01111 | [1 −1] | 1 | 9 |
| 10000 | [1 1] | 2 | 0 |
| 10001 | [1 −1] | 2 | 0 |
| 10010 | [1 1] | 3 | 0 |
| 10011 | [1 −1] | 3 | 0 |
| 10100 | [1 1] | 2 | 3 |
| 10101 | [1 −1] | 2 | 3 |
| 10110 | [1 1] | 3 | 3 |
| 10111 | [1 −1] | 3 | 3 |
| 11000 | [1 1] | 2 | 6 |
| 11001 | [1 −1] | 2 | 6 |
| 11010 | [1 1] | 3 | 6 |
| 11011 | [1 −1] | 3 | 6 |
| 11100 | [1 1] | 2 | 9 |
| 11101 | [1 −1] | 2 | 9 |
| 11110 | [1 1] | 3 | 9 |
| 11111 | [1 −1] | 3 | 9 |

B) Another method for determining the set of combinations of OCC, CS and comb is that:

The UE determines, by receiving higher layer signaling or according to a protocol, that the set of OCCs is {OCC0, ..., OCCm, ..., OCCM-1}, where M is the sum of the set of OCCs, and the set of combs is {comb0, ..., combn, ..., combN-1}, where N is the sum of the set of combs, and the set of CSs is as shown in Table 9 or 10, or the CS number is other CS numbers than those in Table 9 or 10, then the set of CSs is {CS0, ..., CSq, ..., CSQ-1}, where Q is the sum of the set of CSs. The maximum possible number of combinations of the set of OCCs, the set of combs and the set of combs is M*N*Q. Since the number of supported multiplexing PUSCH users may be less than M*N*Q, then M*N*Q DMRSs will not be required, and therefore, part of combinations may be used to be selected from the M*N*Q combinations of OCC, comb, and CS to form a set, and the set is a subset of the set {(OCC0, comb0, CS0), ..., (OCCm, combn, CSq), ..., (OCCM-1, combN-1, CSQ-1)}, and the UE determines, by receiving higher layer signaling or according to a protocol, a subset of the set of combinations of OCC, comb and CS, in which the number of combinations of OCC, CS and comb in the subset is L, then determines a combination of OCC, comb, and CS to be used by the DMRS of the UE from the subset of the set of the combinations of OCC, comb and CS, and the number of bits used for instruction signaling of the combination of OCC, comb, and CS may be a ceiling value of [log 2(L)]. The UE obtains a combination of OCC, comb, and CS to be used by the DMRS of the UE by receiving instruction signaling of the combination of OCC, comb, and CS.

For example, M equals to 2, the set of OCCs is {[1 1],[1 −1]}, N equals to 2, the set of combs is {0, 1}, Q equals to 4, and the set of CSs is {0, 3, 6, 9}. According to the maximum possible number of combinations of the set of OCCs, the set of combs and the set of combs being 2*2*4=16, the number L of the DMRSs currently used is determined, i.e., the actual number of DMRSs used L=8, then 8 of the 16 combinations of OCC, comb, and CS are selected, and the number of bits used for instruction signaling of the combinations of OCC, comb, and CS may be [log 2(8)]=3. Assume that a mapping relationship between instruction signaling values of the combinations of OCC, comb, and CS and selected combinations of OCC, comb, and CS is as shown in Table 19. The UE obtains a combination of OCC, comb, and CS to be used by the DMRS of the UE by receiving instruction signaling of a combination of OCC, comb, and CS.

TABLE 19 combination of OCC, comb, and CS and
instruction signaling value of the combination
of OCC, comb, and CS mapping relationship

| instruction signaling value of combination of OCC, comb and CS | OCC | comb | CS |
|---|---|---|---|
| 000 | [1 1] | 0 | 0 |
| 001 | [1 −1] | 0 | 0 |
| 010 | [1 1] | 1 | 3 |
| 011 | [1 −1] | 1 | 3 |
| 100 | [1 1] | 0 | 6 |
| 101 | [1 −1] | 0 | 6 |
| 110 | [1 1] | 1 | 9 |
| 111 | [1 −1] | 1 | 9 |

Or, for example, M equals to 2, the set of OCCs is {[1 1],[1 −1]}, N equals to 2, the set of combs is {0, 1}, Q equals to 8, and the set of CSs is {0, 2, 3, 4, 6, 8, 9, 10}. The maximum possible number of combinations of the set of OCCs, the set of combs and the set of combs is 2*2*8=32, but the number of DMRSs actually used is 8, then 8 out of 32 combinations of OCC, comb, and CS will be selected, and the number of bits used for instruction signaling of the combinations of OCC, comb, and CS is [log 2(8)]=3. Assume that a mapping relationship between instruction signaling values of the combinations of OCC, comb, and CS and the selected combinations of OCC, comb, and CS is as shown in Table 20. The UE obtains a combination of OCC, comb, and CS to be used by the DMRS of the UE by receiving instruction signaling of the combination of OCC, comb, and CS.

TABLE 20 combination of OCC, comb, and CS and
instruction signaling value of the combination
of OCC, comb, and CS mapping relationship

| combination of OCC, comb, and CS instruction signaling value | OCC | comb | CS |
|---|---|---|---|
| 000 | [1 1] | 0 | 0 |
| 001 | [1 −1] | 0 | 3 |
| 010 | [1 1] | 1 | 2 |

TABLE 20-continued combination of OCC, comb, and CS and
instruction signaling value of the combination
of OCC, comb, and CS mapping relationship

| combination of OCC, comb, and CS instruction signaling value | OCC | comb | CS |
|---|---|---|---|
| 011 | [1 −1] | 1 | 8 |
| 100 | [1 1] | 0 | 6 |
| 101 | [1 −1] | 0 | 9 |
| 110 | [1 1] | 1 | 4 |
| 111 | [1 −1] | 1 | 10 |

Or, for example, M equals to 2, the set of OCCs is {[1 1],[1 −1]}, N equals to 2, the set of combs is {0, 1}, Q equals to 8, and the set of CSs is {0, 2, 3, 4, 6, 8, 9, 10}. Assuming that the maximum possible number of combinations of the set of OCCs, the set of combs and the set of combs is 2*2*8=32, and the number of DMRSs actually used is 16, then 16 of the 32 combinations of OCC, comb, and CS will be selected, and the number of bits used for instruction signaling of the combination of OCC, comb, and CS is [log 2(16)]=4. Assume that a mapping relation between instruction signaling values of the combinations of OCC, comb, and CS and the selected combinations of OCC, comb, and CS is as shown in Table 21. The UE obtains a combination of OCC, comb, and CS to be used by the DMRS of the UE by receiving instruction signaling of the combination of OCC, comb, and CS.

TABLE 21 combination of OCC, comb, and CS and
instruction signaling value of the combination
of OCC, comb, and CS mapping relationship

| combination of OCC, comb, and CS instruction signaling value | OCC | comb | CS |
|---|---|---|---|
| 0000 | [1 1] | 0 | 0 |
| 0001 | [1 −1] | 0 | 2 |
| 0010 | [1 1] | 1 | 0 |
| 0011 | [1 −1] | 1 | 2 |
| 0100 | [1 1] | 0 | 6 |
| 0101 | [1 −1] | 0 | 8 |
| 0110 | [1 1] | 1 | 6 |
| 0111 | [1 −1] | 1 | 8 |
| 1000 | [1 1] | 0 | 3 |
| 1001 | [1 −1] | 0 | 4 |
| 1010 | [1 1] | 1 | 3 |
| 1011 | [1 −1] | 1 | 4 |
| 1100 | [1 1] | 0 | 9 |
| 1101 | [1 −1] | 0 | 10 |
| 1110 | [1 1] | 1 | 9 |
| 1111 | [1 −1] | 1 | 10 |

A principle of selecting the combination of OCC, CS and comb from the possible combinations of the set of OCCs, the set of combs and the set of combs is first, the selected different combinations of OCC, CS and comb should ensure that when the PUSCH frequency-domain resources allocated to the UEs overlap incompletely, the number of DMRSs that are still orthogonal is the maximum. As shown in Table 21, since the number of OCCs in the set of OCCs is 2, and the number of combs in the set of combs is 2, then when the PUSCH frequency-domain resources allocated to the UEs overlap incompletely, there will be 4 orthogonal DMRSs to the maximum in each subset, which are DMRSs generated from a subset of the four combinations of OCC, comb and CS, instruction signaling values of the combinations of OCC, comb, and CS are {0000, 0001, 0010, 0011}, and DMRSs generated from a subset of the four combinations of OCC, comb, and CS, instruction signaling values of the combinations of OCC, comb, and CS are {0100, 0101, 0110, 0111}, and DMRSs generated from a subset of the four combinations of OCC, comb, and CS, instruction signaling values of the combinations of OCC, comb, and CS are {1000, 1001, 1010, 1011}, and DMRSs generated from a subset of the four combinations of OCC, comb and CS, instruction signaling values of the combinations of OCC, comb, and CS are{1100, 1101, 1110, 1111}. For combinations where OCCs and combs are same, but CSs are different, they are not orthogonal when the PUSCH frequency-domain resources allocated to the UEs overlap incompletely, and they are orthogonal when the PUSCH frequency-domain resources allocated to the UEs overlap completely, so that the greater the interval between their CSs is, the less is affected by interference of orthogonality between them. For example, OCCs and combs of four combinations of OCC, comb, and CS, of which instruction signaling values of the combinations of OCC, comb, and CS are {0000, 0100, 1000, 1100} are the same, the maximum interval between their CSs is {0, 6, 3, 9} respectively.

Embodiment 2

In this embodiment 2, a method for transmitting demodulation reference signals in case of a PUSCH without control signaling scheduling (Grant-less) will be described.

There are two situations for UEs to select resources. A situation is that the number of PRBs of frequency-domain resources selected by the UEs to transmit PUSCHs is related to the positions of the frequency-domain resources, e.g., the number of PRBs that the UEs use at different positions of the frequency-domain resources are different. In this way, either the frequency-domain resources used by the UEs for transmitting the PUSCHs overlap completely, or the frequency-domain resources used by the UEs for transmitting the PUSCHs do not overlap at all. As shown in FIG. 8, the frequency-domain resources of the numbers of PRBs being 1, 2, and 4 for transmitting PUSCHs do not overlap at all. In this situation, as long as one of the three factors, OCC, DMRS comb or CS of DMRS, is different, DMRSs are orthogonal. Another situation is that the numbers of PRBs of the frequency-domain resources for transmitting PUSCHs allocated to the UEs are independent of the positions of the frequency-domain resources, e.g., the numbers of PRBs that the UEs use at the same position of the frequency-domain resources may be same or different. In this way, the frequency-domain resources used by the UEs for transmitting PUSCHs may overlap completely, or the frequency-domain resources used by the UEs for transmitting the PUSCHs may overlap incompletely. In this situation, as long as one of the two factors, the DMRS OCC and DMRS comb, is different, DMRSs are orthogonal, but when the CSs of DMRSs are different, DMRSs may or may not be orthogonal.

Since a PUSCH is not scheduled by DCI in this case, it is the UE that decides whether to transmit the PUSCH or not, and parameters of the UE for transmitting the PUSCH is configured by higher layer signaling or selected independently by the UE, and therefore, it cannot be instructed by physical layer signaling, i.e., the OCC, and/or comb and/or CS to be used by the DMRS of the UE is instructed by instruction signaling in DCI.

First, the number of the OCCs of the DMRS is M (M is a positive integer larger than or equal to 1, and it is configured by higher layer signaling (including system information or UE-specific higher layer signaling), or determined by a protocol, e.g., M=1, 2, 4, 8, and the like), and the set of OCCs is {OCC0, . . . , OCCm, . . . , OCCM−1}, and it is determined by a protocol. The number of combs of the DMRS is N (N is a positive integer larger than or equal to 1, and it is configured by higher layer signaling (including system information or UE-specific higher layer signaling), or determined by a protocol, e.g., N=1, 2, 4, 8, and the like), and the set of combs is {comb0, . . . , combn, . . . , combN−1}, and it is determined by a protocol. The number of the CSs of the DMRS is q (q is a positive integer larger than or equal to 1, and it is configured by higher layer signaling (including system information or UE-specific higher layer signaling), or determined by a protocol, e.g., q =1, 2, 4, 8, 12, and the like), and the set of CSs is as shown in Table 7 or Table 8, or determined by a protocol.

In the following, several methods for transmitting DMRSs will be described.

Method 1:

A UE determines an OCC, and/or a CS, and/or a comb to be used by a DMRS of the UE by receiving higher layer signaling (including system information or UE-specific higher layer signaling) configuration, or by a protocol.

Specifically, the following three methods may be included:

The first method is that the UE determines a candidate set from a set of OCCs, a set of CSs and a set of combs to be used by a DMRS of the UE by receiving higher layer signaling (including system information or UE-specific higher layer signaling) or by a protocol first. Then the UE determines the OCC to be used from the set of OCCs, and/or determines the CS to be used from the set of CSs, and/or determines the comb to be used from the set of the combs by being configured by higher layer signaling or by independent selection of the UE.

The second method is that the UE determines the combination of OCC, and/or CS, and/or comb to be used by the DMRS of the UE by receiving higher layer signaling (including system information or UE-specific higher layer signaling).

In the following, how to determine a specific combination of OCC, and/or CS, and/or comb to be used by the DMRS of the UE from the set of OCCs, the set of CSs and the set of combs will be described.

First, a method for determining an OCC of the DMRS will be described, where the set of OCCs is {OCC0, . . . , OCCm, . . . , OCCM−1}. For example, when the UE determines that the number of SC-FDMA or OFDM symbols for the DMRS is 2 by receiving higher layer signaling or according to a protocol, the number of the OCCs is 2, and the set of OCCs to be used by the UE is {[w(0) w(1)]=[1 1], [w(0) w(1)]=[1 −1]}, then the OCC to be used by the DMRS of the UE is determined by higher layer signaling or by independent selection of UE.

Or, for example, when the UE determines that the number of SC-FDMA or OFDM symbols to be used for the DMRS is 4, the number of OCCs is 4, and the set of OCC [w(0) w(1) w(2) w(3)] to be used by the DMRS of the UE is {[1 1 1 1],[1 1 −1 −1],[1 −1 −1 1],[1 −1 1 −1]} by receiving higher layer signaling or according to a protocol, the OCC to be used by the DMRS of the UE is instructed by higher layer signaling or selected initiatively by the UE.

Or, for example, when the UE determines that the number of SC-FDMA or OFDM symbols used for the DMRS is 4 by receiving higher layer signaling or according to a protocol, then the possible number of OCCs is 4. But when the UE determines that the number of OCCs possibly to be used by the UE is 2 and the set of OCCs [w(0) w(1) w(2) w(3)] to be used by the DMRS of the UE is {[1 1 1 1],[1 1 −1 −1]} by receiving higher layer signaling, the OCC to be used for the DMRS of the UE is configured by higher layer signaling or selected initiatively by the UE.

When the number of OCCs in the set of OCCs to be used for the DMRS are other numbers, a similar method may be used to determine the set of OCCs first, then an OCC to be used by the DMRS of the UE is configured by higher layer signaling (including system information or UE-specific higher layer signaling), or selected initiatively by the UE.

Or the OCC is determined related to the number of PRBs for transmitting a PUSCH selected by the UE. For example, a set of PRB numbers that the UE may select for transmitting PUSCHs may be determined by higher layer signaling (including system information or UE-specific higher layer signaling) or by a protocol (for example, the PRB numbers allocated that are possibly selected by the UE are 1, 2, 4, and 8), then an OCC is determined for PUSCH demodulation reference signal of each PRB number, for example, determining the OCC for PUSCH demodulation reference signal of each PRB number in the set of PRB numbers by a protocol or by higher layer signaling (including system information or UE-specific higher layer signaling). For example, when the PRB numbers allocated possibly by the UE are 1, 2, 4, and 8, and available OCCs are {[1 1 1 1],[1 1 −1 −1],[1 −1 −1 1],[1 −1 1 −1]}, a mapping relationship between PRB numbers and OCCs is as shown in Table 4. In this way, when the PRB numbers of PUSCH frequency-domain resources selected by UEs are different, and start PRBs of the PUSCH frequency-domain resources selected by UE are the same, it is ensured that when the PRB numbers of PUSCH frequency-domain resources allocated to the UEs are different, their DMRSs are orthogonal by selecting different OCCs for the UEs that select different PRB numbers. When the PRB numbers of PUSCH frequency-domain resources selected by the UEs are the same, and the start PRBs of PUSCH frequency-domain resources selected by the UEs are the same, a same OCC may be selected for the DMRSs of the UEs and then the UEs may select CSs randomly, and if the CSs selected by the UEs are different, the DMRS of the UE are orthogonal.

Then, a method for determining combs will be described, in which the set of combs is {comb0, . . . , combn, . . . , combN−1}. For example, the UE determines that the number of combs to be used for the DMRS is 2, and a set of combs to be used by the UE is {0, 1} by receiving higher layer signaling or by a protocol, then, a comb to be used by the DMRS of the UE may be determined by higher layer signaling (including system information or UE-specific higher layer signaling) or selected initiatively by the UE. For example, when a repetition factor (RPF) of DMRSs is 2, there are two combs, i.e., 0 and 1, and a comb to be used by the DMRS of the UE is configured by higher layer signaling (including system information or UE-specific higher layer signaling) or selected initiatively by the UE. When the comb equals to 0, subcarriers occupied by the DMRS of the UE are subcarriers for transmitting PUSCH on PRBs selected by the UE, a PRB interval of which is 2, and a start subcarrier of the DMRS is a start subcarrier of PRBs for transmitting PUSCH selected by the UE, and when the comb equals to 1, subcarriers occupied by the DMRS of the UE are subcarriers for transmitting PUSCH on PRBs selected by the UE, a PRB interval of which is 2, and a start subcarrier of the DMRS is the start subcarrier of the PRBs for transmitting PUSCH selected by the UE plus 1.

Or, for example, when the UE determines that the number of combs used as the DMRS is 4 and a set of combs to be used by the UE is {0, 1, 2, 3} by receiving higher layer signaling or by a protocol, then, a comb to be used by the DMRS of the UE is selected according to higher layer signaling (including system information or UE-specific higher layer signaling) or initiative selection by the UE. When the comb equals to 0, subcarriers occupied by the DMRS of the UE are subcarriers of PRBs for transmitting the PUSCH selected by the UE, an interval between which is 4, and a start subcarrier of the DMRS is the start subcarrier of the PRBs for transmitting PUSCH selected by the UE, and when the comb equals to 1, subcarriers occupied by the DMRS of the UE are subcarriers of PRBs for transmitting the PUSCH selected by the UE, an interval between which is 4, and a start subcarrier of the DMRS is the start subcarrier of the PRBs for transmitting PUSCH selected by the UE plus 1, when the comb equals to 2, subcarriers occupied by the DMRS of the UE are subcarriers of PRBs for transmitting PUSCH selected by the UE, an interval between which is 4, and a start subcarrier of the DMRS is the start subcarrier of the PRBs for transmitting PUSCH selected by the UE plus 2, and when the comb equals to 3, subcarriers occupied by the DMRS of the UE are subcarriers of PRBs for transmitting PUSCH selected by UE, an interval between which is 4, and a start subcarrier of the DMRS is the start subcarrier of the PRBs for transmitting PUSCH selected by the UE plus 3.

Or, for example, the UE determines that the repetition factor (RPF) for the DMRS is 4, the number of combs to be used by the DMRS of the UE is 2, and a set of combs to be used by the DMRS of the UE is {0, 2} by receiving higher layer signaling or by protocol, then, a comb to be used by the DMRS of the UE is selected by higher layer signaling (including system information or UE-specific higher layer signaling) or selected initiatively by the UE. When the comb equals to 0, subcarriers occupied by the DMRS of the UE are subcarriers of PRBs for transmitting PUSCH selected by the UE, an interval between which is 4, and a start subcarrier of the DMRS is the start subcarrier of the PRBs for transmitting PUSCH selected by the UE, and when the comb equals to 2, subcarriers occupied by the DMRS of the UE are subcarriers of the PRBs for transmitting PUSCH selected by the UE, an interval between which is 4, and a start subcarrier of the DMRS is the start subcarrier of the PRBs for transmitting PUSCH selected by the UE plus 2.

When the number of combs used for the DMRS is other numbers, a similar method may be used to determine a set of combs first, then a comb to be used by the DMRS of the UE is determined by higher layer signaling or selected initiatively by the UE.

Or a comb to be used by the DMRS of the UE is determined related to the number of PRBs for transmitting a PUSCH selected by the UE. For example, a set of PRB numbers that may be selected by the UE for transmitting the PUSCH is determined according to higher layer signaling (including system information or UE-specific higher layer signaling) or by a protocol (for example, the PRB numbers that may be selected for transmitting PUSCH may be 1, 2, 4, and 8), then the UE determines a comb according to a PUSCH demodulation reference signal of a PRB number for transmitting the PUSCH. For example, the UE determines a comb of a PUSCH demodulation reference signal of each PRB number in the set of PRB numbers according to a protocol or higher layer signaling (including system information or UE-specific higher layer signaling). For example, when the PRB numbers that the UE may select for transmitting the PUSCH are 1, 2, 4, and 8, and available combs are 0, 1, 2, and 3, a mapping relationship between the PRB numbers and combs is shown in Table 8. allocated In this way, if the PRB numbers of PUSCH frequency-domain resources selected by UEs are different, and start PRBs of PUSCH frequency-domain resources selected by the UEs are the same, it is ensured that by selecting different combs in case of different PRB numbers, it is ensured that when the PRB numbers of PUSCH frequency-domain resources allocated to the UEs are different, DMRSs of the UEs are orthogonal.

Then, a method of determining CSs will be described. For example, when the number of CSs of the DMRS is 8, the CSs to be used by the DMRS of the UE are configured by higher layer signaling (including system information or UE-specific higher layer signaling), or selected initiatively by the UE. When the number of CSs to be used for the DMRS are other numbers, a similar method may be used to first determine a set of CSs first, then configure the CS to be used by the DMRS of the UE by higher layer signaling, or select the CS to be used by the DMRS of the UE initiatively by the UE.

Method 2:

First, A UE determines a set of combinations of any two or three factors, i.e., the DMRS OCC, CS and comb, by being configured by higher layer signaling or by a protocol, then selects a combination of OCC, CS and comb to be used by the DMRS of the UE from the set of combinations by being configured by higher layer signaling or by initiative selection by the UE.

In the above method 2, the first method for determining OCC, CS and comb is that determining a set of combinations of OCC and comb by being configured by higher layer signaling or by a protocol, and then determining a combination of OCC and comb to be used by the DMRS of the UE from the set of the combinations of OCC and comb by being configured by higher layer signaling or by initiative selection by the UE. The CS to be used by the DMRS of the UE is configured by higher layer signaling separately, or selected initiatively by the UE.

It is because that when the PUSCH frequency-domain resources selected by UEs overlap incompletely, and when DMRSs of different UEs may use different OCCs or combs, DMRSs of the different UEs are orthogonal, when PUSCH frequency-domain resources selected by the UEs overlap incompletely, and when the DMRSs of different UE use different CSs, DMRSs of the different UEs are not orthogonal, but when the PUSCH frequency-domain resources selected by the UEs overlap completely, and when the DMRSs of the different UEs use different OCCs, combs or CSs, the DMRSs of the different UEs are orthogonal. In this way, when there are PUSCH frequency-domain resources selected by multiple UEs, PUSCH frequency-domain resources selected by part of UEs overlap completely, and PUSCH frequency-domain resources allocated to the other part of UEs overlap incompletely. For UEs, PUSCH frequency-domain resources selected of which overlap completely, the UEs may use a same combination of OCC and comb, and different UEs select different CSs, such that DMRSs of different UEs are orthogonal, for UEs, PUSCH frequency-domain resources selected of which overlapping incompletely, different UEs select different CSs, such that DMRSs of the different UEs are not orthogonal, and the UEs may use different combinations of OCC and comb, such that DMRSs of different UEs are orthogonal. A set of OCCs is {OCC0, ..., OCCm, ..., OCCM−1}, where M is the sum of the set of OCCs, a set of combs is {comb0, ..., combn, ..., combN−1}, where N is the sum of the set of combs, and a set of combinations of OCC and comb is {(OCC0, comb0), ..., (OCCm, combn), ..., (OCCM−1, combN−1)}, and a set of combinations of OCC and combs to be used by DMRSs of the UEs may be a set {(OCC0, comb0), ..., (OCCm, combn), ..., (OCCM−1, combN−1)}, or a subset of the set. The sum of the set of OCCs is M, the sum of the set of combs is N, or the combinations of OCC and comb to be used by the DMRSs of the UEs are configured by a protocol or by higher layer signaling. When the sum M of the set of OCCs, the sum N of the set of combs, or the set of combinations of OCC and comb to be used by the DMRSs of the UEs are determined, combinations of OCC and comb to be used by the DMRSs of the UEs may be determined by higher layer signaling or by initiative selection by the UEs.

For example, a UE determines that a set of OCCs is {[1 1],[1 −1]}, that a set of combs is {0, 1}, and that the set of combinations of OCC and comb is as shown in Table 11 by receiving higher layer signaling or by a protocol. Or, the UE determines that the set of OCCs is {[1 1],[1 −1]}, that the set of combs is {0, 1, 2, 3}, and that the set of combinations of OCC and comb is as shown in Table 12 by receiving higher layer signaling or by a protocol. In this way, after a set of combinations of OCC and comb is obtained, a specific combination of OCC and comb to be used by the DMRS of the UE will be determined by higher layer signaling or by initiative selection by the UE.

Or, a UE determines the set of OCCs is {[1 1],[1 −1]}, the set of combs is {0, 1, 2, 3}, and the set of OCCs possibly to be used by the UE is {[1 1],[1 −1]}, the UE using possibly set of combs is {0, 2} by receiving higher layer signaling or by a protocol, and the set of combinations of OCC and comb is as shown in Table 15. In this way, after the set of combinations of OCC and comb is obtained, the specific combination of OCC and comb to be used by the DMRS of the UE is determined by higher layer signaling or by initiatively selection by the UE.

In the above method 2, the second method for determining OCC, CS and comb is that determining a set of combinations of OCC, comb, and CS by being configured by higher layer signaling or by a protocol, and then determining a combination of OCC, comb, and CS to be used by the DMRS of the UE from the set of the combinations of OCC, comb, and CS by being configured by higher layer signaling configuration or by a protocol.

For example, a UE determines that a set of OCCs is {OCC0, ..., OCCm, ..., OCCM−1}, where M is the sum of the set of OCCs, and a set of combs is {comb0, ..., combn, ..., combN−1}, where N is the sum of the set of combs by receiving higher layer signaling or by a protocol, and a set of CSs is as shown in Table 9 or 10, or the number of CSs is other numbers than those in Table 9 or 10, then the set of CSs is {CS0, ..., CSq, ..., CSQ−1}, where Q is the sum of the set of CSs. In the following, a set of combinations of OCC, comb, and CS will be described.

a) A method for determining the set of combinations of OCC, CS, and comb is that when the number of combinations in the set of combinations of OCC, CS and comb is M*N*Q, and the set of combinations of OCC, CS and comb is {(OCC0, comb0, CS0), ..., (OCCm, combn, CSq), ..., (OCCM−1, combN−1, CSQ−1)}, a combination of OCC, CS and comb from the set of combinations of OCC, CS and comb to be used by the DMRS of the UE is configured by higher layer signaling or selected initiatively by the UE.

For example, M equals to 2, the set of OCCs is {[1 1],[1 −1]}, N equals to 4, the set of combs is {0, 1, 2, 3}, Q equals to 4, and the set of CSs is {0, 3, 6, 9}. A combination of OCC, CS and comb from the set of combinations of OCC, CS and comb to be used by the UE is configured by higher layer signaling, or selected initiatively by the UE.

b) Another method for determining the set of combinations of OCC, CS and comb is that:

A UE determines that the set of OCCs is {OCC0, ..., OCCm, ..., OCCM-1}, where M is the sum of the set of OCCs, and the set of combs is {comb0, ..., combn, ..., combN-1}, where N is the sum of the set of combs by receiving higher layer signaling or by a protocol, and the set of CSs is as shown in Table 9 or 10, or the number of CSs is other numbers than those in Table 9 or 10, then the set of CSs is {CS0, ..., CSq, ..., CSQ-1}, where Q is the sum of the set of CSs. The maximum number of possible combinations of the set of OCCs, the set of combs and the set of combs is M*N*Q. Since the number of UEs that support multiplexing PUSCH may be less than M*N*Q, then M*N*Q DMRSs will not be required, and therefore, part of combinations are to be selected from the M*N*Q combinations of OCC, comb, and CS to form a set, and the set is a subset of the set {(OCC0, comb0, CS0), ..., (OCCm, combn, CSq), ..., (OCCM-1, combN-1, CSQ-1)}. The UE determines the OCCs, CSs and combs in the subset of the set of combinations of OCC, CS and comb, and determines that the number of combinations that can be used by the DMRS of the UE is L and the combinations of OCC, CS and comb in the subset of the set of combinations of OCC, CS and comb. Then a combination of OCC, CS and comb is configured by higher layer signaling or selected initiatively by the UE from the set of combinations of OCC, CS and comb to be used by the DMRS of the UE.

Or, for example, M equals to 2, the set of OCCs is {[1 1],[1 −1]}, N equals to 2, the set of combs is {0, 1, 2, 3}, Q equals to 4, and the set of CSs is {0, 3, 6, 9}. The UE determines an available set of OCCs to the UE is {[1 1],[1 −1]}, N equals to 2, a set of combs is {0, 1}, Q equals to 2, and a set of CSs is {0, 6} by receiving higher layer signaling or by a protocol. Then a combination of OCC, CS and comb to be used for the UE from the set of combinations of OCC, CS and comb is configured by higher layer signaling or selected initiatively by the UE.

Or, for example, M equals to 2, the set of OCCs is {[1 1],[1 −1]}, N equals to 2, the set of combs is {0, 1}, Q equals to 8, and the set of CSs is {0, 2, 3, 4, 6, 8, 9, 10}. Since the maximum possible number of combinations of the set of OCCs, the set of combs and the set of combs is 2*2*8=32, and the number of DMRSs actually used is 16, then 16 of 32 combinations of OCC, comb, and CS should be selected. It is determined that M equals to 2, that a set of OCCs available to the UE is {[1 1],[1 −1]}, that N equals to 2, that the set of combs is {0, 1}, that Q equals to 4, and the set of CSs is {0, 3, 6, 9,} by being configured by higher layer signaling or by a protocol. A combination of OCC, CS and comb from the set of combinations of OCC, CS and comb to be used by the DMRS of the UE is configured by higher layer signaling or selected initiatively by the UE.

The principle of selecting the combination of OCC, CS and comb from the possible combinations of the set of OCCs, the set of combs and the set of combs is that first, the selected different combinations of OCC, CS and comb should ensure that when the frequency-domain resources for transmitting PUSCH selected by the UEs overlap incompletely, the number of DMRSs that are still orthogonal is the maximum. As shown in Table 16, since the number of OCCs in the set of OCCs is 2, and the number of combs in the set of combs is 2, then when the frequency-domain resources for transmitting PUSCH selected by the UEs overlap incompletely, there will be 4 orthogonal DMRSs to the maximum in each subset. The 4 orthogonal DMRSs are a DMRS generated from a subset of four combinations of OCC, comb and CS, instruction signaling values of the combinations of OCC, comb, and CS are {0000, 0001, 0010, 0011}, a DMRS generated from a subset of four combinations of OCC, comb and CS, instruction signaling values of the combinations of OCC, comb, and CS are {0100, 0101, 0110, 0111}, a DMRS generated from a subset of four combinations of OCC, comb and CS, instruction signaling values of the combinations of OCC, comb, and CS are {1000, 1001, 1010, 1011}, and a DMRS generated from a subset of four combinations of OCC, comb, and CS, instruction signaling values of the combinations of OCC, comb, and CS are {1100, 1101, 1110, 1111}. For combinations of OCC, comb and CS, in which OCCs and combs are same but CSs are different, they are not orthogonal when the frequency-domain resources for transmitting PUSCH selected by UEs overlap incompletely, and DMRSs of them are orthogonal when the frequency-domain resources for transmitting PUSCH selected by UEs overlap completely, so that the greater the interval between CSs is, the less is affected by the interference of the orthogonality between them. For example, OCCs and combs of 4 combinations of OCC, comb and CS, instruction signaling values of which are {0000, 0100, 1000, 1100}, are the same, the maximum intervals between their CSs are {0, 6, 3, 9} respectively.

Embodiment 3

In this embodiment 3, a power control method for a DMRS with comb being introduced will be described. For example, a UE determines power of transmitting a DMRS according to whether the DMRS uses a comb and according to a format of the comb.

In traditional PUSCH power, for a UE, a PUSCH and a DMRS use the same subcarriers, and transmission power of the PUSCH and power of the DMRS for demodulating the PUSCH are the same. When the DMRS with comb is introduced, a PUSCH of a UE is transmitted on all the subcarriers, but a DMRS of the UE is transmitted on subcarriers having a RPF interval, and the UE transmits nothing on subcarriers between the subcarriers for transmitting the DMRS. In this way, if transmission power of the UE on each DMRS subcarrier and transmission power on each PUSCH subcarrier are same, then total transmission power of the UE on all subcarriers of a DMRS SC-FDM or OFDM symbol is smaller than total transmission power of the UE on all subcarriers of a PUSCH SC-FDM or OFDM symbol, which means that power of the UE has been wasted.

A method for determining DMRS power is that if a UE transmits a DMRS using a comb format, total power of all subcarriers that transmit a DMRS within each SC-FDM symbol is the same with total power of all subcarriers that transmit a PUSCH within each SC-FDM symbol.

Another method for determining DMRS power is that if a UE transmits a DMRS using a comb format, transmission power of the UE on each DMRS subcarrier and transmission power of the UE on each PUSCH subcarrier are the same.

Another method for determining DMRS power is that if a UE transmits a DMRS using a comb format, power of a DMRS transmitted on each DMRS subcarrier and power of a PUSCH transmitted on each PUSCH subcarrier are different, and total transmission power of the UE on all subcarriers of each DMRS SC-FDM symbol and total transmission power of the UE on all subcarriers of each PUSCH SC-FDM symbol are the same, i.e., transmission power of the UE on each subcarrier of each DMRS SC-FDM symbol is RPF times of transmission power of the UE on each subcarrier of each PUSCH SC-FDM symbol, PDMRS=RPF*PPUSCH, or transmission power of the UE on each subcarrier of each DMRS SC-FDM symbol is PDMRS=min{RPF*PPUSCH,P1}, where PDMRS is transmission power (dBm) of the UE on each subcarrier of each DMRS SC-FDM symbol, PPUSCH is transmission power (dBm) of the UE on each subcarrier of each PUSCH SC-FDM, and P1 is the allowable maximum difference (configured by higher layer signaling, or determined by a protocol) between transmission power of the UE on each subcarrier of each DMRS SC-FDM and transmission power of the UE on each subcarrier of each PUSCH SC-FDM. For example, when the RPF equals to 2, the UE transmits a DMRS on subcarriers, an interval between which is 2, and power of the DMRS transmitted on each DMRS subcarrier by the UE is 2 times of power of the PUSCH transmitted on each PUSCH subcarrier by the UE, i.e., power of a DMRS transmitted on each DMRS subcarrier by the UE being 3 dB larger than power of a PUSCH transmitted on each PUSCH subcarrier by the UE. When the RPF equals to 4, the UE transmits a DMRS on subcarriers, an interval between which is 4, and power of the DMRS transmitted on each DMRS subcarrier by the UE is 2 or 4 times of power of the PUSCH transmitted on each PUSCH subcarrier by the UE, i.e., power of a DMRS transmitted on each DMRS subcarrier by the UE is 3 dB or 6 dB larger than power of a PUSCH transmitted on each PUSCH subcarrier by the UE. When the RPF equals to 8, the UE transmits a DMRS on subcarriers, an interval between which is 8, and power of the DMRS transmitted on each DMRS subcarrier by the UE is 2, 4 or 8 times of transmission power of the PUSCH transmitted on each PUSCH subcarrier by the UE, i.e., power of a DMRS transmitted on each DMRS subcarrier by the UE being 3 dB, 6 dB or 9 dB larger than power of a PUSCH transmitted on each PUSCH subcarrier by the UE. In this way, the difference between power for transmitting a DMRS on each DMRS subcarrier and power for transmitting a PUSCH on each PUSCH subcarrier will not be too large.

Embodiment 4

In this embodiment 4, a method for generating a DMRS sequence with a comb being introduced will be described. For example, a UE determines a DMRS sequence to be transmitted according to whether the DMRSs uses a comb and according to a format of the comb. When a DMRS does not use a comb, the number of subcarriers occupied by the DMRS and the number of subcarriers occupied by a PUSCH are the same, and therefore, the length of the DMRS sequence and the number of subcarriers of the PUSCH scheduled by the UE in the frequency domain are the same. However, when a DMRS uses a comb, the number of subcarriers used by the UE actually for transmitting the DMRS in the frequency domain and the number of subcarriers of the PUSCH scheduled by UE in the frequency domain are different. Then, the DMRS may be generated as the following methods.

The length of a DMRS sequence is in accordance with the number of subcarriers that the UE actually uses to transmit DMRSs in the frequency domain, and the DMRS sequence is generated according to traditional methods. For example, when the number of subcarriers of a PUSCH scheduled by the UE in the frequency domain is 48, i.e., 4 PRBs, and a RPF of the DMRS equals to 4, then, according to the length of the DMRS sequence being equal to 12, the DMRS sequence is generated according to the method described in the part 5.5.2 of 3GPP TS36.211, V8.9.0 (December of 2009). When the number of subcarriers of a PUSCH scheduled by the UE in the frequency domain is $M_{SC}^{PUSCH}$, and when the DMRS sequence of the UE uses a comb, the number of subcarriers of the DMRSs actually transmitted by the UE in the frequency domain equals to the number of subcarriers of the PUSCH scheduled by UE in the frequency domain, i.e., $M_{SC}^{PUSCH}$/RFP. At present, since an elementary unit of a PUSCH scheduled by the UE in the frequency domain is a PRB, i.e., 12 subcarriers, and therefore, the length of the DMRS sequence transmitted in the frequency domain is also a multiple of 12. So, when the number of PRBs of the PUSCH scheduled by the UE in the frequency domain is not an integer multiple of the RPF, the number of subcarriers of DMRSs in the frequency domain is not a multiple of 12, and in this case, there is not an available DMRS sequence. A method is that, if the number of PRBs of the PUSCH scheduled by the UE in the frequency domain resources is an integral multiple M of the RPF, the length of the transmitted DMRS sequence is M the number of PRBs, i.e., M times of the number of PRBs, and in this way, it is ensured that there is an available DMRS sequence. Another method is that, if the number of PRBs of the PUSCH scheduled by the UE in the frequency-domain resources is not an integral multiple of the RPF, the UE generates a new DMRS sequence different from a DMRS sequence in the prior art, and the new DMRS sequence satisfies the following conditions when PUSCHs scheduled by UEs in the frequency-domain resources are the same, and DMRS RPFs are also the same, if CSs of two DMRS sequences are different, then the two DMRS sequences are orthogonal. Another method is that, the number of PRBs of the PUSCH in the frequency-domain resources scheduled by the UE may not be an integral multiple of the RPF, and the number of the subcarriers of the PUSCH scheduled by the UE in the frequency-domain resources is used as the length of the DMRS sequence, and then the DMRS sequence is punched or truncated according to the length of the DMRS sequence. A method of punching is that within a range of scheduled PRBs, the DMRS sequence in the positions of transmitting DMRSs is transmitted, and the DMRS sequence in other positions is punched, i.e., the rest of the DMRS sequence being not used for transmitting. For example, when the RPF equals to 2, even-number positions in the DMRS sequence are transmitted, and odd-number positions in the DMRS sequence are not transmitted. A truncation method is that within the range of the scheduled PRBs, the UE transmits the DMRS sequence successively on DMRS positions according to an order and a length of the DMRS sequence, and the rest of the DMRS sequence is not transmitted. For example, when the RPF equals to 2, the first half of the DMRS sequence is transmitted on DMRS positions, and the second half of the DMRS sequence will not be transmitted.

Embodiment 5

The number of orthogonal DMRSs can be increase by introducing a comb. However, according to different channel conditions and different requirements for the number of orthogonal DMRSs, for a specific DMRS, the three factors may not be always included. A DMRS may contain one of the three factors, i.e., the DMRS only including the OCC factor, or the DMRS only including the CS factor, or the DMRS only including the comb factor, or a DMRS may include two of the three factors, i.e., the DMRS including the OCC and CS factors, or the DMRS including the OCC and comb factors, or the DMRS containing the comb and CS factors, or a DMRS may contain all of the three factors, i.e., the DMRS including the OCC, CS and comb factors.

A UE may know that how many factors and which factors are contained in a DMRS of the UE by receiving higher layer signaling configuration. For example, the UE in a connected state obtains a DMRS type by receiving higher layer signaling, and the DMRS type specifies that how many factors and which factors are included in a DMRS. For example, according to a traditional 3GPP specification, if higher layer signaling configures Activate-DMRS-with OCC to be true, then a DMRS includes the CS and OCC factors, and if no higher layer signaling configures Activate-DMRS-with OCC, then a DMRS only includes the CS factor. Or how many factors and which factors to be included in a DMRS of the UE in a default state is determined according to a protocol, e.g., a DMRS of a PUSCH scheduled by DCI scrambled with a C-RNTI only including the CS factor. For example, when the comb factor is introduced, new higher layer signaling Activate-DMRS-with OCC and comb may be introduced, and if higher layer signaling configures Activate-DMRS-with OCC and comb to be true, then a DMRS includes the comb, CS and OCC factors, i.e., DMRSs of the UE using different CSs, DMRSs of the UE using different OCC, and DMRSs of the UE using different combs, if higher layer signaling configures Activate-DMRS-with OCC to be true, and no higher layer signaling configures Activate-DMRS-with OCC and comb to be true, then a DMRS includes the CS and OCC factors, i.e., DMRSs of the UE using different CSs, DMRSs of the UE using different OCCs, and DMRSs of the UE using a subcarrier same with that of the PUSCH, and if no higher layer signaling configures Activate-DMRS-with OCC and Activate-DMRS-with OCC and comb to be true, then a DMRS only includes the CS factor. New higher layer signaling may be introduced to determine different factors and different numbers of factors included in a DMRS. Or, new higher layer signaling Activate-DMRS-with comb is introduced, and if higher layer signaling configures Activate-DMRS-with comb to be true, then a DMRS includes the comb and CS factors. For example, the UE may determine whether the comb factor is introduced into a DMRS by receiving higher layer signaling. However, when the number of PRBs included in the PUSCH scheduled by the UE is relatively few, if a DMRS with a comb being introduced is used, performance of channel estimation will be poor. For example, when the PUSCH scheduled by the UE only includes one PRB, and a RPF of a comb of a DMRS is 4, only three resource elements (REs) are used for a DMRS during each time slot, and then performance will be poor. In addition, the shortest length of a traditional DMRS sequence is 12, i.e., a length of a DMRS sequence where the PUSCH scheduled by the UE includes one PRB, and a comb is not introduced, and if the PUSCH scheduled by the UE includes a PRB and the length of a DMRS sequence with a comb being introduced is 3, there is not an available sequence yet, and a new sequence is required to be designed, which is complex to realize using a protocol.

To avoid this issue, if the UE knows that a DMRS format includes the comb factor by receiving higher layer signaling, then the UE may decide whether to use a DMRS with a comb according to the PUSCH scheduled by the UE, or decide whether to use the DMRS with the comb and determine a RPF of a comb included in the DMRS with the comb. In the following, several methods for determining the DMRS format will be described.

Method 1:

When the number of PRBs included in the PUSCH scheduled by the UE is not a multiple of N (N is a positive integer, and it may be a RPF value of a comb, e.g., 2 or 4), the UE uses a DMRS without a comb, and if the number of PRBs included in the PUSCH scheduled by the UE is a multiple of N, the UE uses a DMRS with a comb, where N is a positive integer, configured by a protocol or higher layer signaling, e.g., 2 or 4.

Method 2:

When the number of PRBs included in the PUSCH scheduled by the UE is not a multiple of N (N is a positive integer, and it may be a RPF value of a comb, e.g., 2 or 4) and number of REs in frequency domain is smaller than M (M is an integer, and is preset or RRC configuration), the UE uses a DMRS without a comb, and if the number of PRBs included in the PUSCH scheduled by the UE is a multiple of N, or the number of PRBs contained in the PUSCH scheduled by the UE being not a multiple of N and number of REs in frequency domain is equal or larger than M(M is an integer, and is preset or RRC configuration), the UE uses a DMRS with a comb, where N is a positive integer, configured by a protocol or higher layer signaling, e.g., 2 or 4.

Method 3:

When the number of PRBs included in the PUSCH scheduled by the UE is not a multiple of N1 (N1 is a positive integer, and it may be a RPF value of a comb, e.g., 2), the UE uses a DMRS without a comb, and when the number of PRBs included in the PUSCH scheduled by the UE is a multiple of N1 but not a multiple of N2 (N2 is a positive integer, and it may be a RPF value of a comb, e.g., 4), the UE uses a DMRS containing a comb, the RPF of which is M1 (M1 is a positive integer, and it may be a RPF value of the comb, e.g., 2), then the RPF of the comb contained in the DMRS is M1, when the number of PRBs included in the PUSCH scheduled by the UE is a multiple of N1 and also a multiple of N2, the UE uses a DMRS containing a comb, a RPF of which is M2 (M2 is a positive integer, and may be a RPF value of the comb, e.g., 4), i.e., the RPF of the comb contained in the DMRS is M2, where N1, N2, M1 and M2 are positive integer, N2 is a multiple of N1, M2 is a multiple of M1, configured by a protocol or higher layer signaling, e.g., N1 being equal to 2, N2 being equal to 4, M1 being equal to 2, and M2 being equal to 4.

Method 4:

If the UE knows that a DMRS contains a comb and that a RPF of the comb is M1 by receiving higher layer signaling, then when the number of PRBs included in the PUSCH scheduled by the UE is not a multiple of N1, the UE uses a DMRS without a comb, and when the number of PRBs included in the PUSCH scheduled by the UE is a multiple of N1, the UE uses a DMRS which contains a comb, a RPF of which is M, i.e., the RPF of the comb contained in the DMRS being M1. For example, N1 is equal to 2, and M1 is equal to 2. N1 and M1 are positive integers, configured by a protocol or higher layer signaling, e.g., N1 being equal to 2, and M1 being equal to 2.

If the UE knows that a DMRS contains a comb and that a RPF of the comb is M2 by receiving higher layer signaling, then when the number of PRBs included in the PUSCH scheduled by the UE is not a multiple of N2, the UE uses a DMRS without a comb, and when the number of PRBs included in the PUSCH scheduled by the UE is a multiple of N2, the UE uses a DMRS containing a comb, a RPF of which is M2, i.e., the RPF of the comb contained in the DMRS being M2. For example, N2 is equal to 4, and M2 is equal to 4. N1, N2, M1 and M2 are positive integers, where N2 is a multiple of N1, and M2 is a multiple of M1, which are configured by a protocol or higher layer signaling, e.g., N1 being equal to 2, N2 being equal to 4, M1 being equal to 2, and M2 being equal to 4.

Method 5:

If the UE knows that a DMRS contains the comb factor by receiving higher layer signaling, the UE may decide whether to use a DMRS containing a comb and determine a RPF of the comb contained in the DMRS according to information bit instruction in UL DCI of the PUSCH scheduled by the UE. Information bit instruction is called comb instruction information. For example, when 2 bits are used for comb instruction information, a mapping relationship between comb instruction information values and definitions thereof is shown in Table 22. Values of comb when different RPFs are used are configured by higher layer signaling.

TABLE 22

| Value of Comb Instruction Information | Definition |
| --- | --- |
| 00 | Using a DMRS without a comb |
| 01 | Using a DMRS with a comb, a RPF of which is 2 |
| 10 | Using a DMRS with a comb, a RPF of which is 4 |
| 11 | Reserved |

Method 6:

If the UE knows that a DMRS contains the comb factor by receiving higher layer signaling, the UE may decide whether to use a DMRS containing a comb according to information bit instruction in UL DCI of the PUSCH scheduled by the UE. Information bit instruction is called comb instruction information. For example, when the comb uses 1 bit, a mapping relationship between values of comb instruction information and definitions thereof is shown in Table 23, and when comb instruction information instructs that a DMRS containing a comb is not used, a parameter of the DMRS, e.g., instruction without comb is used for OCC and CS instruction, and when comb instruction information instructs using a DMRS containing a comb, a parameter of the DMRS, e.g., instruction with comb is used for OCC, CS and comb instruction.

TABLE 23

| Value of Comb Instruction Information | Definition |
| --- | --- |
| 0 | Using DMRS without a comb |
| 1 | Using DMRS with a comb |

Method 7:

If the UE knows that a DMRS contains the comb factor by receiving higher layer signaling and knows a RPF value by receiving higher layer signaling, then the UE may decide whether to use a DMRS containing a comb and determine a comb value of the comb contained in the DMRS according to information bit instruction in UL DCI of the PUSCH scheduled by the UE. Information bit instruction is called comb instruction information, e.g., RPF being equal to 2, a set of combs being {0,1}, comb instruction information using 2 bits, and a mapping relationship between values of comb instruction information and definitions thereof is shown in Table 24.

TABLE 24

| Value of Comb Instruction | Definition |
| --- | --- |
| 00 | Using a DMRS without a comb |
| 01 | Using a DMRS with a comb, and the comb being 0 |
| 10 | Using a DMRS with a comb, and the comb being 1 |
| 11 | Reserved |

For example, when RFP is 4, a set of comb is {0, 1, 2, 3}, and 3 bits are used for comb instruction information, a mapping relationship between values of comb instruction information and definitions thereof is shown in Table 25.

TABLE 25

| Value of Comb Instruction Information | Definition |
| --- | --- |
| 000 | Using a DMRS without a comb |
| 001 | Using a DMRS with a comb, and the comb being 0 |
| 010 | Using a DMRS with a comb, and the comb being 1 |
| 011 | Using a DMRS with a comb, and the comb being 2 |
| 100 | Using a DMRS with a comb, and the comb being 3 |
| 101 | Reserved |
| 110 | Reserved |
| 111 | Reserved |

Method 8:

If the UE knows that a DMRS contains the comb factor by receiving higher layer signaling, the UE may determine whether to use a DMRS containing a comb, determine a RPF value in the comb contained in the DMRS, and comb values when RPF values are different according to information bit instruction in UL DCI of the PUSCH scheduled by the UE. Information bit instruction is called comb instruction information, e.g., RPF being equal to 2, a set of combs being {0, 1}, and RPF being equal to 4, a set of combs being {0, 1, 2, 3}.

TABLE 26

| Value of Comb Instruction Information | Definition |
| --- | --- |
| 000 | Using a DMRS without a comb |
| 001 | Using a DMRS with a comb, where a RPF is equal to 2 and the comb is 0 |
| 010 | Using a DMRS with a comb, where a RPF is equal to 2 and the comb is 1 |
| 011 | Using a DMRS with a comb, where a RPF is equal to 4 and the comb is 0 |
| 100 | Using a DMRS with a comb, where a RPF is equal to 4 and the comb is 1 |

TABLE 26-continued

| Value of Comb Instruction Information | Definition |
|---|---|
| 101 | Using a DMRS with a comb, where a RPF is equal to 4 and the comb is 2 |
| 110 | Using a DMRS with a comb, where a RPF is equal to 4 and the comb is 3 |
| 111 | Reserved |

When the UE knows that a DMRS contains the comb factor by receiving higher layer signaling, to prevent the foregoing issue from being generated when the number of PRBs included in the PUSCH scheduled by the UE is relatively small, the UE uses different CSs to generate multiple orthogonal DMRSs, the UE may not use CSs to differentiate DMRSs of different UEs, which can be realized by a base station.

In summary, in the uplink demodulation reference signal format for demodulating the PUSCH determined in the present disclosure, besides of the CS and/or OCC, the comb may also be selected. The comb is that DMRSs occupy subcarriers having specific intervals and the intervals between the occupied subcarriers are the same, i.e., using a comb format to transmit DMRSs. Demodulation reference signals with different combs are orthogonal, and when PUSCH frequency-domain resources allocated to different UEs overlap completely, demodulation reference signals using different combs of UEs are orthogonal, and when the PUSCH frequency-domain resources allocated to the different UEs overlap incompletely, the demodulation reference signals using different combs are still orthogonal. When the comb structure is used to transmit DMRSs, on the one hand, the capacity of the DMRSs can be increased, so that more UEs can multiplex the uplink physical resources. On the other hand, when the PUSCH frequency-domain resources allocated to different UEs overlap incompletely, and the UEs are going to multiplex the uplink physical resources, DMRSs using different CSs are not orthogonal, but, DMRSs using different combs are orthogonal, more UEs can still multiplex the uplink physical resources. Hence, the present disclosure can increase the number of DMRSs that keep orthogonal when the PUSCH frequency-domain resources overlap incompletely, and thus can improve the multiplexing ratio of the uplink physical resources in a multi-user scenario.

Further, the respective function modules in the embodiments of the present disclosure may be integrated into one processing unit, or may be each separate physical module. Alternatively, two or more than two modules may integrate into one unit. The above integrated unit not only may be implemented with hardware, but also may be implemented with software function units. The function modules in the each module may be located at one terminal or network mode, or may be distributed to multiple terminals or network modes.

Further, each embodiment of the present disclosure may be implemented by data processing applications, which may be executed by the data processing device, such as a computer. Apparently, the data processing application may constitute embodiments of the present disclosure. Further, the data processing application stored in a storage medium generally may be executed by reading the data processing application out from the storage medium, and installing or copying the data processing application to a storage device (such as hardware or memory) of the data processing device. Therefore, the storage medium may constitute embodiments of the present disclosure. The storage medium may adopt any recording mode, such as a paper storage medium (such as, a paper tape), a magnetic storage medium (such as, floppy, disk and flash), an optical storage medium (such as, compact disc read-only memory (CD-ROM)), and a magneto-optical storage medium (such as magneto-optical (MO)).

Therefore, embodiments of the present disclosure further disclose a storage medium which may store a data processing application. The data processing application may be used to execute any of the foregoing embodiments of the methods of the present disclosure.

Further, the method operations in above embodiments of the present disclosure not only may be implemented via the data processing application, but also may be implemented via hardware, such as a logic gate, a switch, an application-specific integrated circuit (ASIC), a programmable logic controller (PLC) and an embedded microcontroller. Therefore, hardware, which may implement the methods of the present disclosure, may constitute the embodiments of the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of a terminal in a wireless communication system, the method comprising:
   receiving, from a base station, a message indicating that the terminal is configured with an uplink demodulation reference signal (DMRS) with a frequency interval;
   receiving, from the base station, first information indicating a cyclic shift for the uplink DMRS, an orthogonal cover code for the uplink DMRS and a subcarrier for the uplink DMRS by using 3 bits and second information indicating whether the first information is used to generate the uplink DMRS with the frequency interval;
   generating a DMRS based on the message, the first information and the second information;
   mapping the DMRS on a resource element identified based on the first information and the second information; and
   transmitting, to the base station, the DMRS and uplink data.

2. The method according to claim 1,
   wherein the message is a radio resource control (RRC) signaling, and
   wherein the first information and the second information are included in downlink control information scheduling a transmission of the uplink data.

3. The method according to claim 1, wherein the transmitting comprises multiplying a scaling factor to a transmission power of the DMRS, the scaling factor being determined based on the second information.

4. The method according to claim 1,
   wherein the resource element to which the DMRS is mapped is determined based on a bit value of the first information and the second information, and
   wherein the DMRS is mapped on the resource element with an interval between subcarriers.

5. A method of a base station in a wireless communication system, the method comprising:

transmitting, to a terminal, a message indicating that the terminal is configured with an uplink demodulation reference signal (DMRS) with a frequency interval;
transmitting, to the terminal, first information indicating a cyclic shift for the uplink DMRS, an orthogonal cover code for the uplink DMRS and a subcarrier for the uplink DMRS by using 3 bits and second information indicating whether the first information is used to generate the uplink DMRS with the frequency interval; and
receiving, from the terminal, a DMRS and uplink data,
wherein the DMRS is generated based on the message, the first information and the second information, and
wherein the DMRS is received on a resource element identified based on the first information and the second information.

6. The method according to claim 5,
wherein the message is a radio resource control (RRC) signaling, and
wherein the first information and the second information are included in downlink control information scheduling a transmission of the uplink data.

7. The method according to claim 5,
wherein the resource element to which the DMRS is mapped is determined based on a bit value of the first information and the second information, and
wherein the DMRS is mapped on the resource element with an interval between subcarriers.

8. The method according to claim 5, wherein the DMRS is received with a power multiplied by a scaling factor determined based on the second information.

9. A terminal in a wireless communication system, the terminal comprising:
a transceiver configured to transmit and receive signals; and
at least one processor coupled with the transceiver and configured to:
control the transceiver to receive, from a base station, a message indicating that the terminal is configured with an uplink demodulation reference signal (DMRS) with a frequency interval,
control the transceiver to receive, from the base station, first information indicating a cyclic shift for the uplink DMRS, an orthogonal cover code for the uplink DMRS and a subcarrier for the uplink DMRS by using 3 bits and second information indicating whether the first information is used to generate the uplink DMRS with the frequency interval,
generate a DMRS based on the message, the first information and the second information,
map the DMRS on a resource element identified based on the first information and the second information, and
control the transceiver to transmit, to the base station, the DMRS and uplink data.

10. The terminal according to claim 9,
wherein the message is a radio resource control (RRC) signaling, and
wherein the first information and the second information are included in downlink control information scheduling a transmission of the uplink data.

11. The terminal according to claim 9, wherein the at least one processor is further configured to transmit the DMRS by multiplying a scaling factor to a transmission power of the DMRS, the scaling factor being determined based on the second information.

12. The terminal according to claim 9,
wherein the resource element to which the DMRS is mapped is determined based on a bit value of the first information and the second information, and
wherein the DMRS is mapped on the resource element with an interval between subcarriers.

13. A base station in a wireless communication system, the base station comprising:
a transceiver configured to transmit and receive signals; and
at least one processor coupled with the transceiver and configured to:
control the transceiver to transmit, to a terminal, a message indicating that the terminal is configured with an uplink demodulation reference signal (DMRS) with a frequency interval,
control the transceiver to transmit, to the terminal, first information indicating a cyclic shift for the uplink DMRS, an orthogonal cover code for the uplink DMRS and a subcarrier for the uplink DMRS by using 3 bits and second information indicating whether the first information is used to generate the uplink DMRS with the frequency interval, and
control the transceiver to receive, from the terminal, a DMRS and uplink data,
wherein the DMRS is generated based on the message, the first information and the second information, and
wherein the DMRS is received on a resource element identified based on the first information and the second information.

14. The base station according to claim 13,
wherein the message is a radio resource control (RRC) signaling, and
wherein the first information and the second information are included in downlink control information scheduling a transmission of the uplink data.

15. The base station according to claim 13,
wherein the resource element to which the DMRS is mapped is determined based on a bit value of the first information and the second information, and
wherein the DMRS is mapped on the resource element with an interval between subcarriers.

16. The base station according to claim 13, wherein the DMRS is received with a power multiplied by a scaling factor determined based on the second information.

* * * * *